United States Patent
Hlava

(10) Patent No.: US 12,228,069 B2
(45) Date of Patent: Feb. 18, 2025

(54) METHOD OF CONTROLLING EXHAUST GAS DELIVERY BETWEEN TURBOCHARGERS

(71) Applicant: Andrew Hlava, Winfield, IL (US)

(72) Inventor: Andrew Hlava, Winfield, IL (US)

(*) Notice: Subject to any disclaimer, the term of this patent is extended or adjusted under 35 U.S.C. 154(b) by 0 days.

(21) Appl. No.: 18/484,120

(22) Filed: Oct. 10, 2023

(65) Prior Publication Data

US 2024/0068392 A1 Feb. 29, 2024

Related U.S. Application Data

(62) Division of application No. 16/945,866, filed on Aug. 1, 2020, now Pat. No. 11,859,525.

(51) Int. Cl.
*F02B 37/18* (2006.01)
*F01N 13/10* (2010.01)
*F01N 13/18* (2010.01)

(52) U.S. Cl.
CPC .............. *F02B 37/18* (2013.01); *F01N 13/10* (2013.01); *F01N 13/1805* (2013.01); *F02B 37/186* (2013.01); *F01N 2240/36* (2013.01); *F01N 2470/14* (2013.01); *F01N 2470/16* (2013.01)

(58) Field of Classification Search
CPC ...... F01N 1/163; F01N 3/0236; F01N 13/087; F01N 13/10; F01N 2240/36; F02B 37/183; F02B 37/186; F02B 37/18; F02M 26/26; F16K 1/20; F16K 1/2014
See application file for complete search history.

(56) References Cited

U.S. PATENT DOCUMENTS

| | | | | |
|---|---|---|---|---|
| 3,576,102 A | * | 4/1971 | West | F02B 37/013 60/602 |
| 2006/0042246 A1 | * | 3/2006 | Gray, Jr. | F02B 37/18 60/600 |
| 2007/0289302 A1 | * | 12/2007 | Funke | F02D 41/0007 60/602 |
| 2012/0210710 A1 | * | 8/2012 | Chevalier | F02D 41/0007 60/602 |

(Continued)

FOREIGN PATENT DOCUMENTS

WO 2004/046519 A1 6/2004

OTHER PUBLICATIONS

Joanthan Lopez, Mazda Wants to Sequentially Stack Two Turbos Together For Compact Packaging, Topspeet, dated Dec. 20, 2017, at https://www.topspeed.com/cars/car-news/mazda-wants-to-sequentially-stack-two-turbos-together-for-compact-packaging-ar178792.html, a capture of this webpage is attached as Exhibit A.

(Continued)

*Primary Examiner* — Jonathan R Matthias
(74) *Attorney, Agent, or Firm* — Erickson Law Group, PC

(57) ABSTRACT

A method of controlling exhaust gas delivery between two turbochargers is disclosed. Exhaust gas is delivered to a first turbocharger through a first exhaust conduit. A valve is opened to allow at least some of the exhaust gas from the first exhaust conduit to bypass the first turbocharger through a second exhaust conduit delivering bypassing exhaust gas to a second turbocharger when the first turbocharger reaches a predefined operating speed or when the manifold pressure upstream of the first turbocharger reaches a predefined pressure.

18 Claims, 19 Drawing Sheets

(56) References Cited

U.S. PATENT DOCUMENTS

2016/0137016 A1 5/2016 Meano
2017/0234207 A1 8/2017 Kondo
2017/0234209 A1 8/2017 Kondo

OTHER PUBLICATIONS

Jason Udy, GM Patents Sequential Turbocharger System With Unique Bypass Valve, Motortrend, dated Jun. 29, 2016, at https://www.motortrend.com/news/gm-patents-sequential-turbocharger-system-unique-bypass-valve/, a capture of this webpage is attached as Exhibit B.

Chris Perkins, Mazda Patent Application Shows Wild Engine With Twin Turbos and Electric Supercharger, Road & Track, dated Aug. 17, 2017, at https://www.roadandtrack.com/new-cars/car-technology/a12025697/mazda-patent-application-shows-wild-engine-with-twin-turbos-and-electric-supercharger/, a capture of this webpage is attached as Exhibit C.

\* cited by examiner

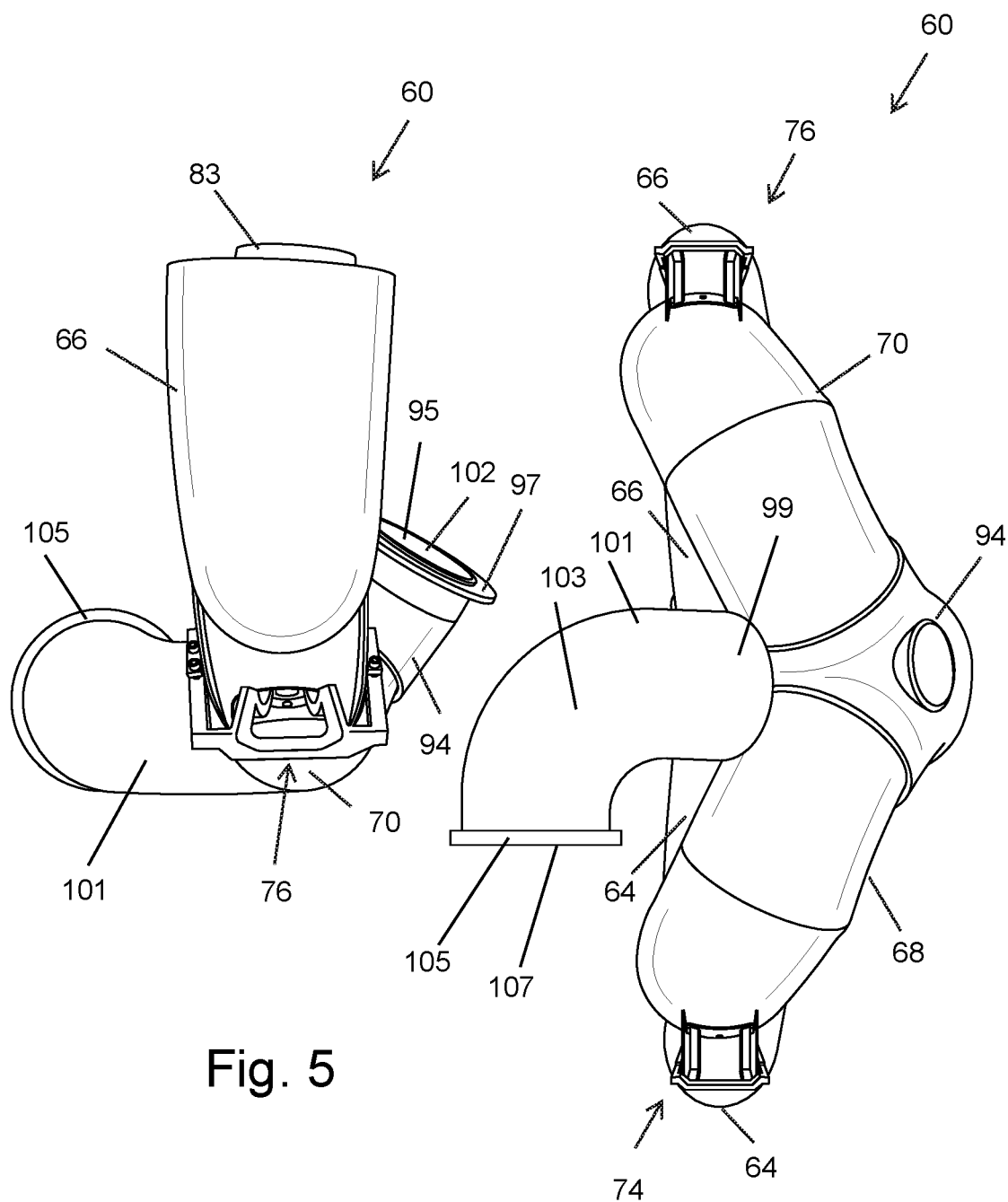

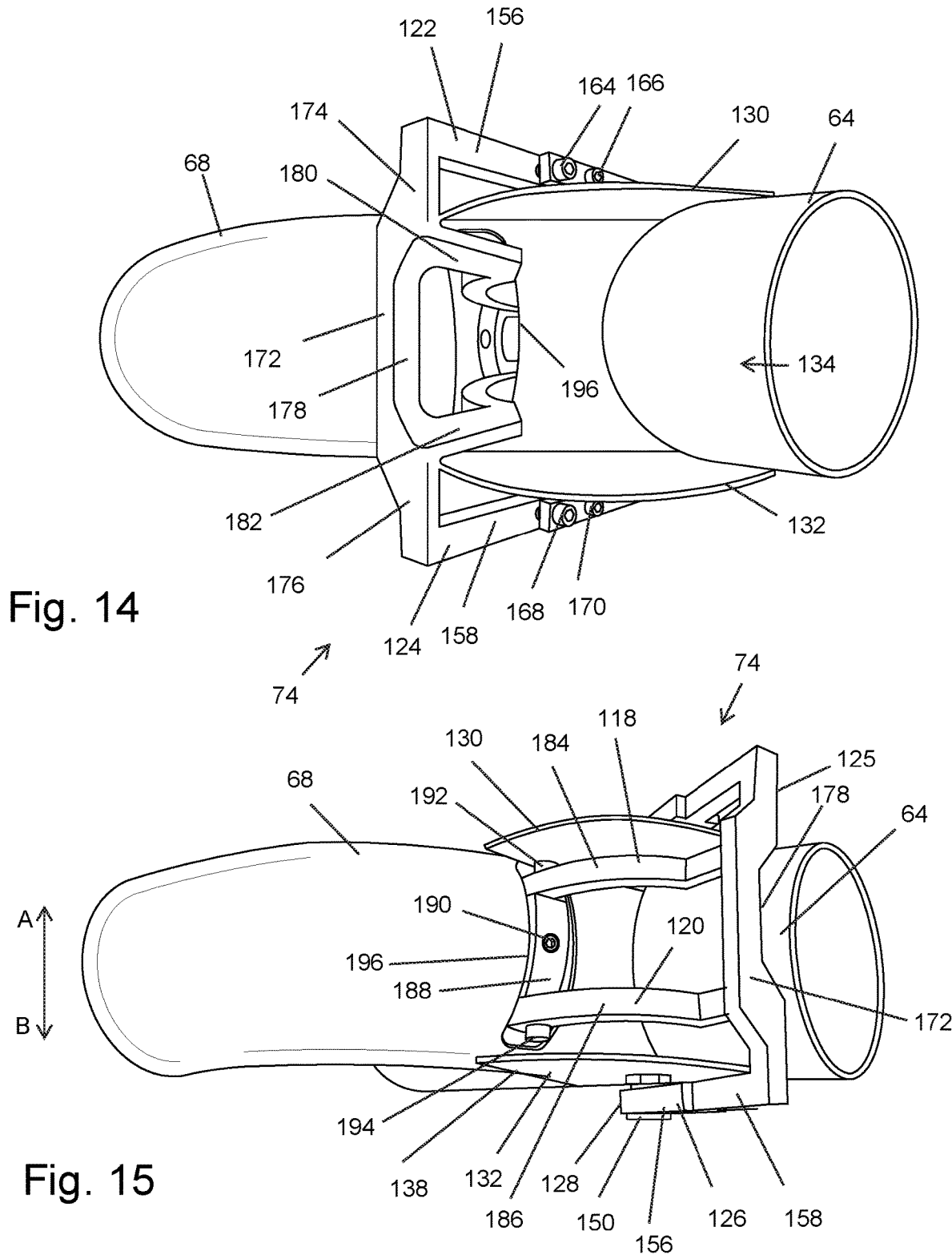

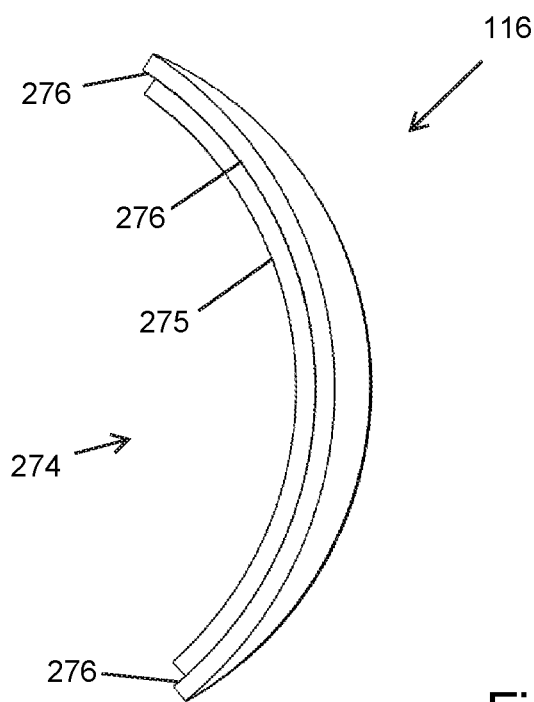
Fig. 21
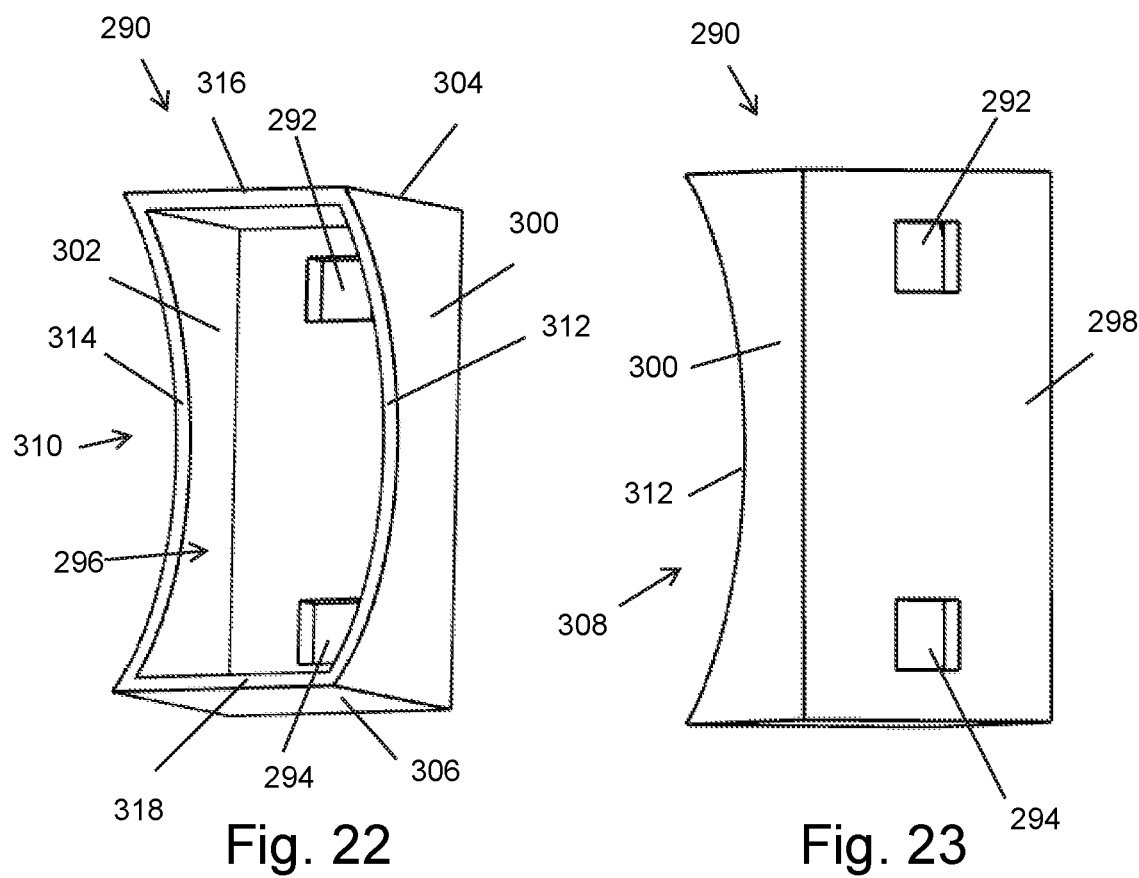
Fig. 22
Fig. 23

METHOD OF CONTROLLING EXHAUST GAS DELIVERY BETWEEN TURBOCHARGERS

This application is a divisional of U.S. patent application Ser. No. 16/945,866, filed Aug. 1, 2020, which is herein incorporated by reference.

FIELD OF THE INVENTION

This invention relates in general to turbocharger manifolds.

BACKGROUND OF THE INVENTION

A turbocharger's ability to quickly deliver compressed intake air, or boost, depends, at least in part, on the size of the turbocharger. Larger turbochargers take more exhaust gas to spin up, which can cause a lag in delivery of compressed air from the compressor of the turbo charger at low speeds. Smaller turbochargers spin up quicker and deliver boost faster, but may not have the same performance at high speeds of operation.

The present inventor recognized the need for a device and method that reduced turbocharger lag while maintaining high speed performance using two turbochargers. The present inventor recognized the need for a turbocharger manifold that selectively directs exhaust gas to one or two turbochargers, depending on conditions. The present inventor recognized the need for a turbocharger manifold valve for directing exhaust gas to a first or second turbocharger.

SUMMARY OF THE INVENTION

A turbocharger manifold is disclosed. In one embodiment, the manifold has a first exhaust conduit, a second exhaust conduit, and a valve. The first exhaust conduit has a first exhaust inlet and a first turbocharger outlet. The second exhaust conduit has a second exhaust inlet and a second turbocharger outlet. The second exhaust inlet is connected to the first exhaust conduit. The valve has an open position and a closed position and controls access from the first exhaust conduit to the second exhaust conduit.

In some embodiments, the manifold comprises a third exhaust conduit, a fourth exhaust conduit, and a second valve. The third exhaust conduit has a third exhaust inlet. The third exhaust conduit is connected to the first turbocharger outlet. The fourth exhaust conduit has a fourth exhaust conduit inlet. The fourth exhaust conduit inlet is connected to the third exhaust conduit. The fourth exhaust conduit is connected to the second turbocharger outlet.

A turbocharger system is disclosed. In one embodiment, the system comprises a first turbocharger, a second turbocharger, and a turbocharger manifold. The first turbocharger has a first turbocharger inlet and a first turbocharger exit. The second turbocharger has a second turbocharger inlet and a second turbocharger exit. The turbocharger manifold has a first exhaust conduit, a second exhaust conduit, and a valve. In some embodiments, the second turbocharger is larger than the first turbocharger.

The first exhaust conduit has a first exhaust inlet and a first turbocharger outlet. The first turbocharger outlet is connected to the first turbocharger inlet of the first turbocharger. The second exhaust conduit has a second exhaust conduit inlet and a second turbocharger outlet. The second exhaust inlet is connected to the first exhaust conduit. The second turbocharger outlet is connected to the second turbocharger inlet of the second turbocharger. The valve has an open position and a closed position and controls access from the first exhaust conduit to the second exhaust conduit.

In some embodiments, the manifold comprises a third exhaust conduit, a fourth exhaust conduit, and a second valve. The third exhaust conduit has a third exhaust inlet. The third exhaust conduit is connected to the first turbocharger outlet. The fourth exhaust conduit has a fourth exhaust conduit inlet. The fourth exhaust conduit inlet is connected to the third exhaust conduit. The fourth exhaust conduit is connected to the second turbocharger outlet.

A method of controlling exhaust gas delivery between two turbochargers is disclosed. Exhaust gas is delivered to a first turbocharger through a first exhaust conduit. A valve is opened to allow at least some of the exhaust gas from the first exhaust conduit to bypass the first turbocharger through a second exhaust conduit delivering bypassing exhaust gas to a second turbocharger when the first turbocharger reaches a predefined operating speed or when the manifold pressure upstream of the first turbocharger reaches a predefined pressure.

Another method of controlling exhaust gas delivery between two turbochargers is disclosed. Exhaust gas is delivered to a first turbocharger through a first exhaust conduit and a third exhaust conduit. A first valve and a second valve are opened, the first valve is opened to allow at least some of exhaust gas from the first exhaust conduit to bypass the first turbocharger through a second exhaust conduit delivering bypassing exhaust gas to a second turbocharger and the second valve opened to allow at least some of exhaust gas from the third exhaust conduit to bypass the first turbocharger through a fourth exhaust conduit delivering bypassing exhaust gas to the second turbocharger, when the first turbocharger reaches a predefined operating speed or when the manifold pressure upstream of the first turbocharger reaches a predefined pressure.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 5 is a sideview of the manifold of FIG. 3.

FIG. 6 is a bottom view of the manifold of FIG. 3.

FIG. 14 is a second side perspective view of the portion of the manifold of FIG. 12.

FIG. 15 is a third side perspective view of the portion of the manifold of FIG. 12.

FIG. 21 is a side view of the door of the valves of FIGS. 12 and 18.

FIG. 22 is a bottom perspective view of a cover for the valves of FIGS. 12 and 18.

FIG. 23 is a top perspective view of the cover of FIG. 22.

DETAILED DESCRIPTION

The following description is presented to enable any person skilled in the art to make and use the invention. For the purposes of explanation, specific nomenclature is set forth to provide a plural understanding of the present invention. While this invention is susceptible of embodiment in many different forms, this description describes and the drawings show specific embodiments of the invention with the understanding that the present disclosure is to be considered as an exemplification of the principles of the invention and is not intended to limit the invention to the specific embodiments illustrated.

Figure 1:
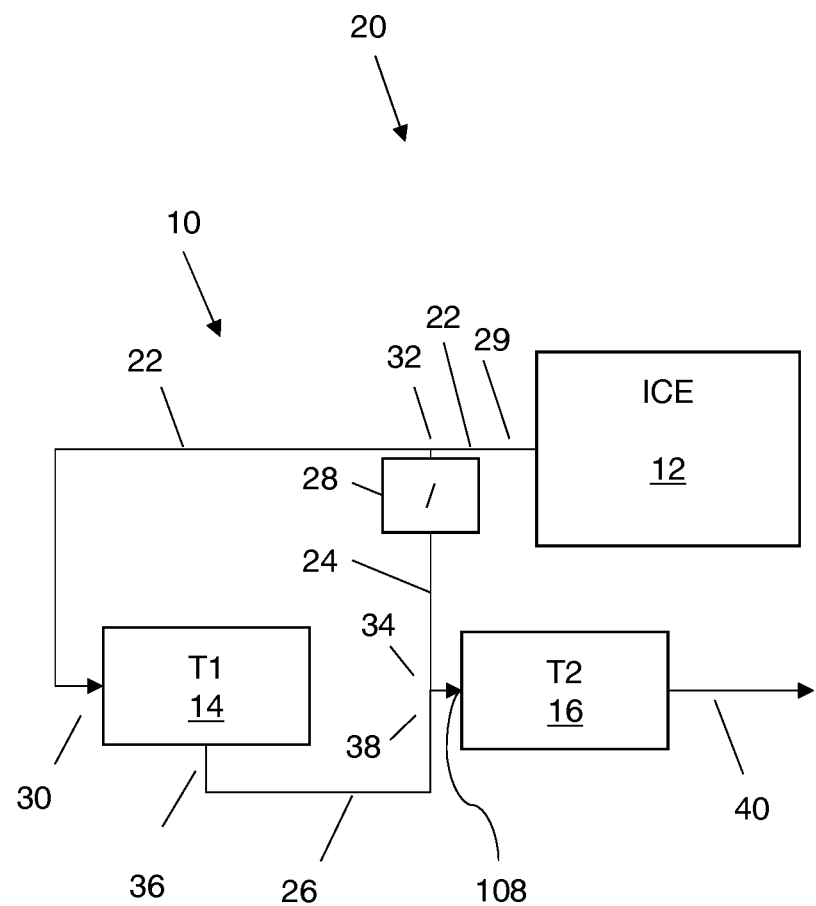
FIG. 1 is a block diagram of an engine system having a first embodiment turbocharger manifold of the invention.

FIG. 1 shows diagram view of a turbocharger manifold 10 deployed with an internal combustion engine 12 and two turbochargers 14, 16 in an engine system 20.

The manifold 10 comprises a first exhaust conduit 22, and a second exhaust conduit 24, a bridge conduit 26, and a valve 28. The first exhaust conduit receives exhaust gas from an engine, such as in internal combustion engine 12, at a first end 29. In some embodiments, the first exhaust conduit connects to an exhaust manifold (not shown) or headers (not shown) of the engine 12. The exhaust manifold or headers of the engine route engine exhaust gas away from one or more engine cylinders 360. Opposite of the engine, the first exhaust conduit has a second end 30 that is for connecting to a first turbocharger 14 at a first turbocharger outlet 43. The second end is for connecting to an exhaust intake opening or port 350 of the turbocharger 14.

The second exhaust conduit 24 joins to the first exhaust conduit 22 at a first intersection 32, between the engine 12 and the second end 30. In some embodiments the second exhaust conduit 24 joins to the first exhaust conduit adjacent the engine 12 as shown in FIG. 1.

The valve 28 controls access to or along the second exhaust conduit. In some embodiments, the valve is located at or adjacent the intersection 32.

Opposite of the intersection 32, the second exhaust conduit has a second end 34 that is for connecting to a second turbocharger 16 via a second turbocharger outlet 47. The second end is for connecting to an exhaust intake opening or port 108 of the turbocharger 16.

The third exhaust conduit has a first end 36 that is for connecting to an exhaust exit opening or port of the first turbocharger 14. A second end 38 of the third exhaust conduit joins with the second exhaust conduit 24 for connecting to the exhaust intake opening or port 108 of the turbocharger 16.

An exhaust exit opening or port 112 of the second turbocharger 16 may be connected to other exhaust system components such as exhaust pipe(s) 40, catalytic converter(s) (not shown), and/or muffler(s) (not shown).

Figure 2:
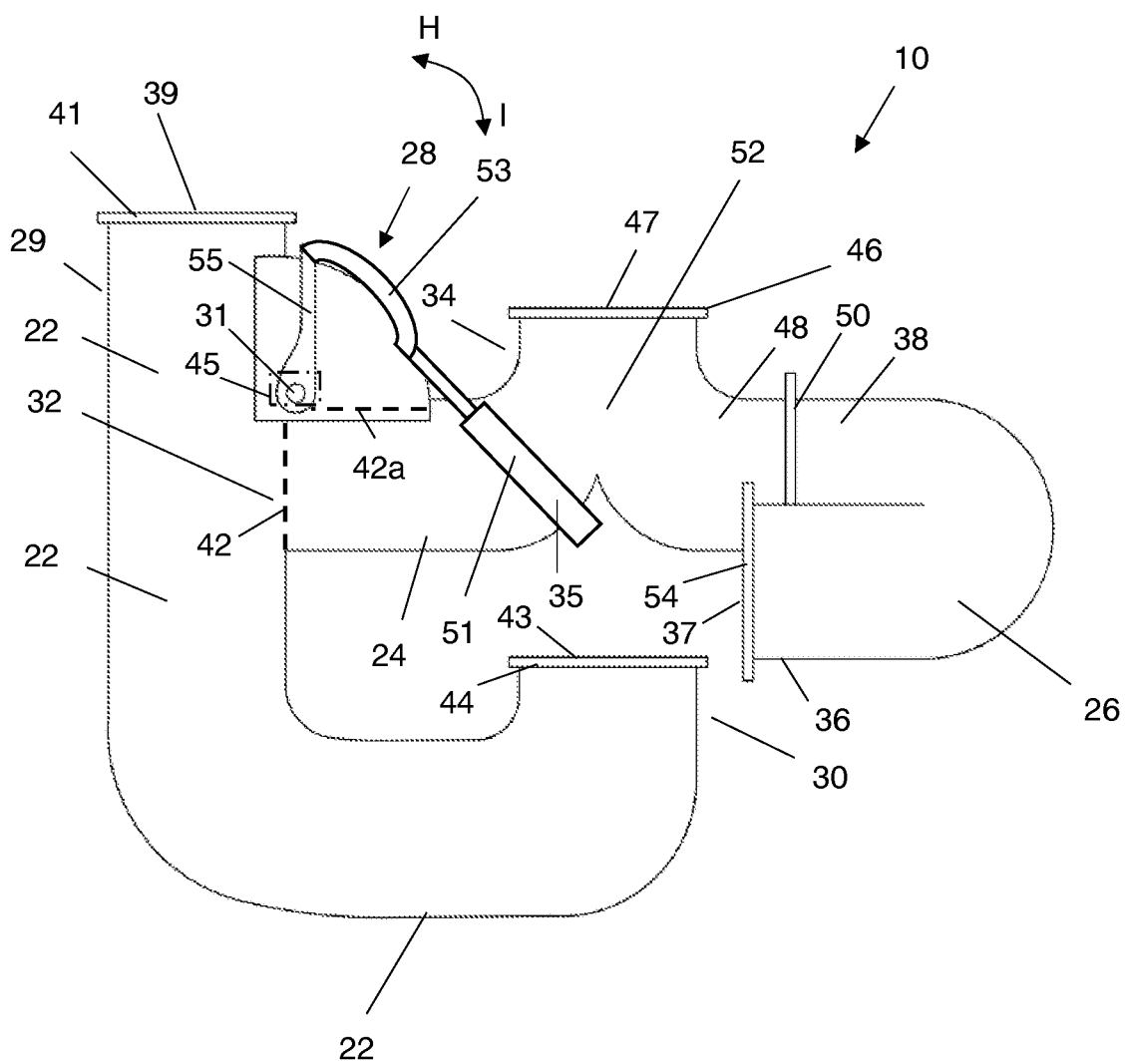
FIG. 2 is a front view of the turbocharger manifold of FIG. 1.

FIG. 2 shows the manifold 10 of FIG. 1 using the same figure labels for the same parts. The first end 29 of the first exhaust conduit 22 comprises a first exhaust inlet 39 and a flange 41 connectable to a corresponding exit flange (not shown) of an exhaust manifold (not shown) or headers (not shown) of the engine 12. The second end 30 comprises a second a first turbocharger outlet 43 and a flange 44 for connecting to the exhaust inlet of first 10 turbocharger 14.

The second exhaust conduit 24 comprises a second turbocharger outlet 47 and a first flange 46 at end 34 for connecting to the second turbocharger 16. The second exhaust conduit comprises a leg 48. The bridge conduit 26 is connectable to the second exhaust conduit at a flange 50. In some embodiments, the second exhaust conduit comprises a Y-intersection 52 at the terminal end of the leg 48.

At the end 36 is a bridge exhaust inlet 37 and a flange 54 for connecting to the exhaust exit opening 350 of the first turbocharger 14.

The valve 28 comprises a door 42. The door is shown in a closed position at 42 and in an open position at 42a. The door 42 is movable between the open and closed positions (directions H and I of FIG. 2) via an arm mechanism 55. The arm mechanism 55 is the same as arm mechanism 117 explained below. In some embodiments, an actuator 51 comprises a moveable rod 53 that is connected to the arm mechanism 55 to move the arm mechanism and the door between the open and closed positions. The actuator is mounted to a portion of the exterior of the conduit 24 as shown in FIG. 2. In some embodiments, the terminal end of the rod 53 is pivotally connected to the arm mechanism with a hinge or pivot connection to allow the rod to move with the arm mechanism in an arcing motion about a pivot location 31 of the arm mechanism 55. In some embodiments, the actuator can be pivotally mounted to the conduit 24 at a rear pivot location 35 to allow the actuator and the rod 53 to move with the arm mechanism 55 between the open and closed positions. In some embodiments, the actuator 51 is the same as actuators 320 or 322, as described below. In some embodiments, instead of actuator 51, the actuator is a motor 45, that rotates the arm mechanism 55 at or about the pivot location between the open position and the closed position. In some embodiments, the motor 45 is the same as motors 325 or 327 explained below.

In some embodiments, the second exhaust conduit comprises the third exhaust conduit and the flange 50 is not used. The third exhaust conduit may be unitary with the second exhaust conduit.

Figure 3:
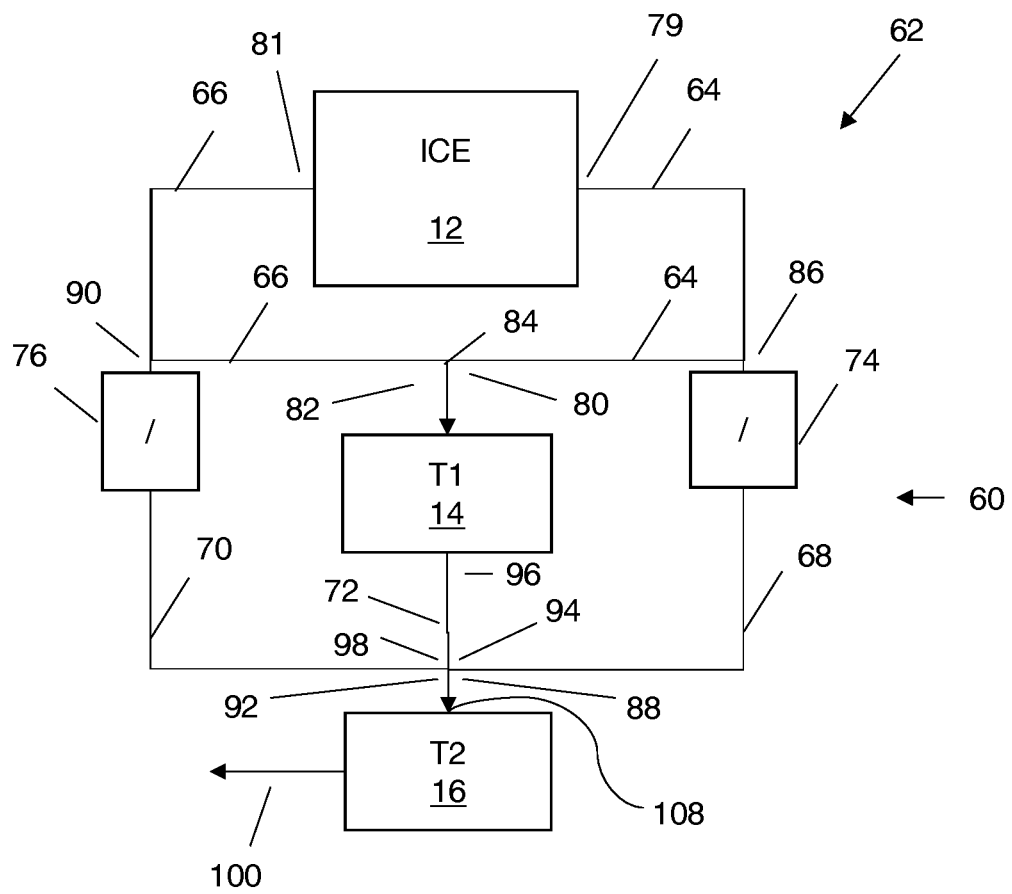
FIG. 3 is a block diagram of a second engine system having a second embodiment turbocharger manifold of the invention.

FIG. 3 shows a second embodiment turbocharger manifold 60 deployed with an internal combustion engine 12 and two turbochargers 14, 16 in an engine system 62.

The manifold 60 comprises a first exhaust conduit 64, a second exhaust conduit 68, a third exhaust conduit 66, a fourth exhaust conduit 70, a fifth exhaust conduit or bridge conduit 72, a first valve 74, and a second valve 76. The valves 74, 76, 28 are the same, but oriented differently as shown and described herein.

The first exhaust conduit 64 receives exhaust gas from an engine, such as in internal combustion engine 12, at a first exhaust inlet 75 at a first end 79. In some embodiments the first exhaust conduit 64 connects to an exhaust manifold (not shown) or headers (not shown) of the engine 12. The first exhaust conduit has a second end 80 that is for connecting to the first turbocharger 14. The second end 80 is for connecting to an exhaust intake opening or port 350 of the turbocharger 14. The second end 80 comprises a first turbocharger outlet section 83. The first turbocharger outlet section 83 comprises a first turbocharger outlet 85.

The third exhaust conduit 66 receives exhaust gas from an engine, such as in internal combustion engine 12, at an exhaust inlet 77 at a first end 81. In some embodiments the third exhaust conduit 66 connects to an exhaust manifold (not shown) or headers (not shown) of the engine 12. The third exhaust conduit has a second end 82 that is for connecting to the first turbocharger 14 at the first turbocharger outlet 85. The second end 82 is for connecting to an exhaust intake opening or port 350 of the turbocharger 14 via the first turbocharger outlet 85.

The second end 80 of the first exhaust conduit 64 and the second end 82 of the third exhaust conduit 66 join at a first intersection 84 and connect therefrom to the turbocharger 14 at the first turbocharger outlet 85.

The second exhaust conduit 68 joins to the first exhaust conduit 64 at a second intersection 86, between the engine 12 and the second end 80. The valve 74 controls exhaust gas access to or along the second exhaust conduit 68. In some embodiments, the valve 74 is located at or adjacent the second intersection 86.

Opposite of the intersection 86, the second exhaust conduit 68 has a second end 88 that is for connecting to a second turbocharger 16 at a second turbocharger outlet 95. The second end is for connecting to an exhaust intake opening or port 108 of the turbocharger 16 at the second turbocharger outlet 95.

The fourth exhaust conduit 70 joins to the third exhaust conduit 66 at a third intersection 90, between the engine 12 and the second end 92. The valve 76 controls access to or along the fourth exhaust conduit 70. In some embodiments, the valve 76 is located at or adjacent the intersection 90.

Opposite of the intersection 90, the fourth exhaust conduit has a second end 92 that is for connecting to a second turbocharger 16 at the second turbocharger outlet 95. The second end is for connecting to an exhaust intake opening or port 108 of the turbocharger 16 at the second turbocharger outlet 95.

The second end 88 of the second exhaust conduit 68 and the second end 92 of the fourth exhaust conduit 70 join at a fourth intersection 94 for a joint conduit connection at the second turbocharger outlet 95 to an exhaust intake opening or port 108 of the turbocharger 16.

A bridge port conduit 101 extends rearward from the fourth intersection 94 at a first end 99. The first end 99 joins with the second and fourth exhaust conduits 68, 70 at the fourth intersection 94.

The conduit 101 has a bend 103, between the first end 99 and a port outlet 107 of the conduit 101. In some embodiments the bend 103 is a ninety-degree bend. The terminal end of the port conduit 101 comprises a flange 105 and the port inlet 107.

A second end 98 of the fifth exhaust conduit 72 comprises a flange 109 and is releasably connected to the flange 105 of the bridge port conduit 101 to direct exhaust in the fifth exhaust conduit into the intersection 94. The fifth exhaust conduit 72 can be connected to the bridge port conduit 101 with a clamp, such as a v-band. A first end 96 of the fifth exhaust conduit 72 is connectable to the exhaust exit port 354 of the first turbocharger.

An exhaust exit opening or port 112 of the second turbocharger 16 can be connected to other exhaust system components such as exhaust pipe(s) 100, catalytic converter(s) (not shown), and/or muffler(s) (not shown).

Figure 4:
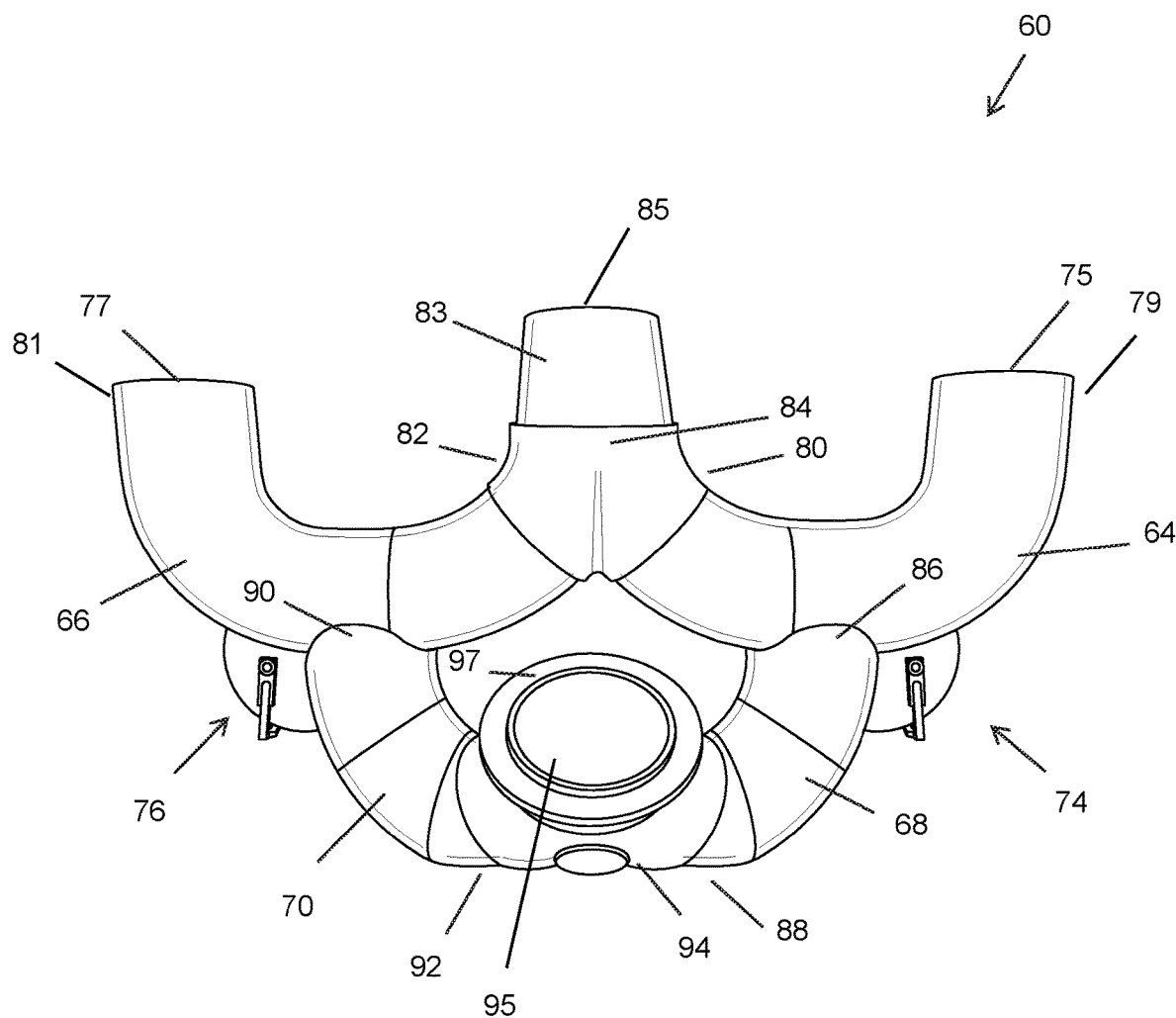
FIG. 4 is a front view of the manifold of FIG. 3 with a bridge conduit not shown.
Figure 7:
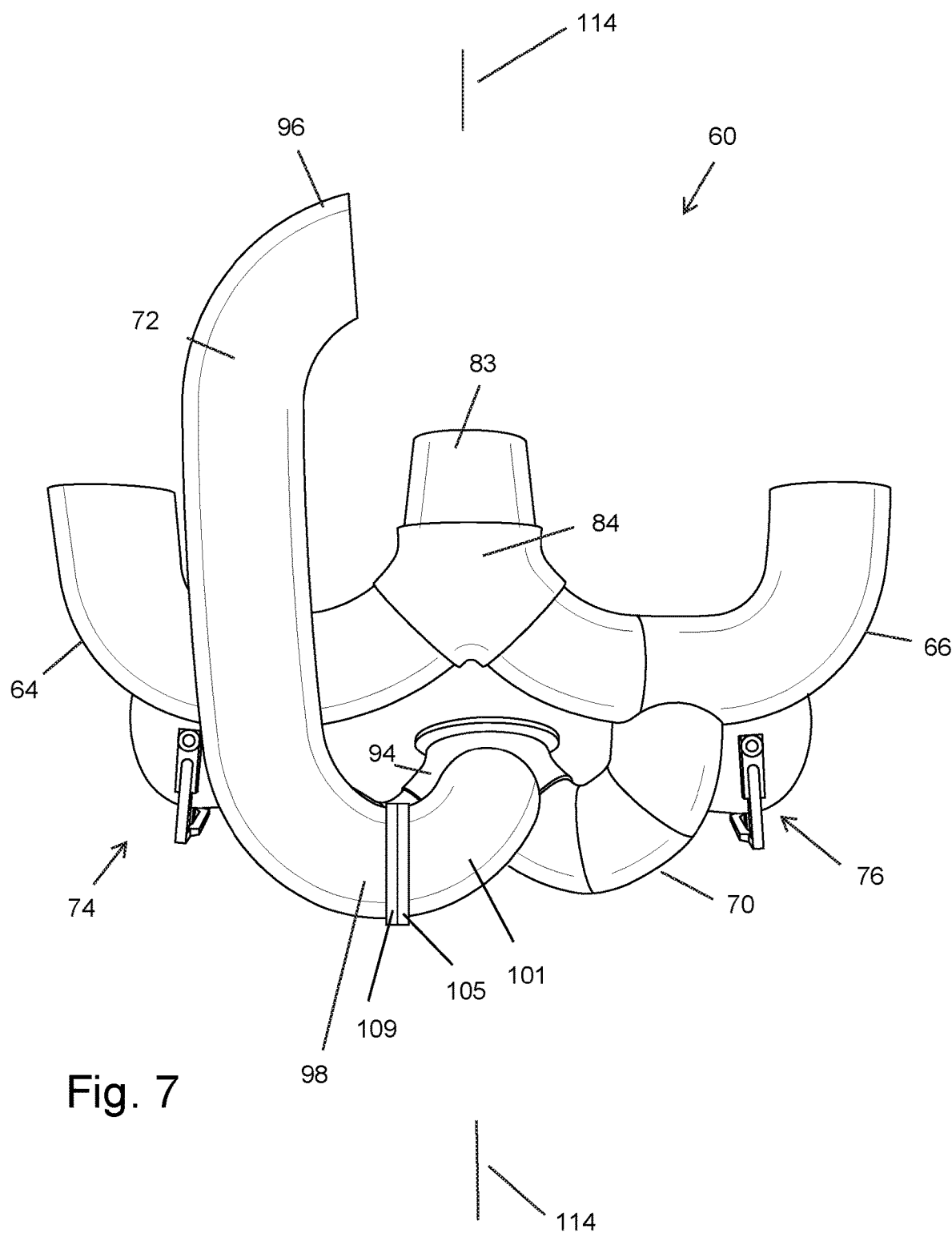
FIG. 7 is a rear view of the manifold of FIG. 3 with a bridge conduit shown.
Figure 8:
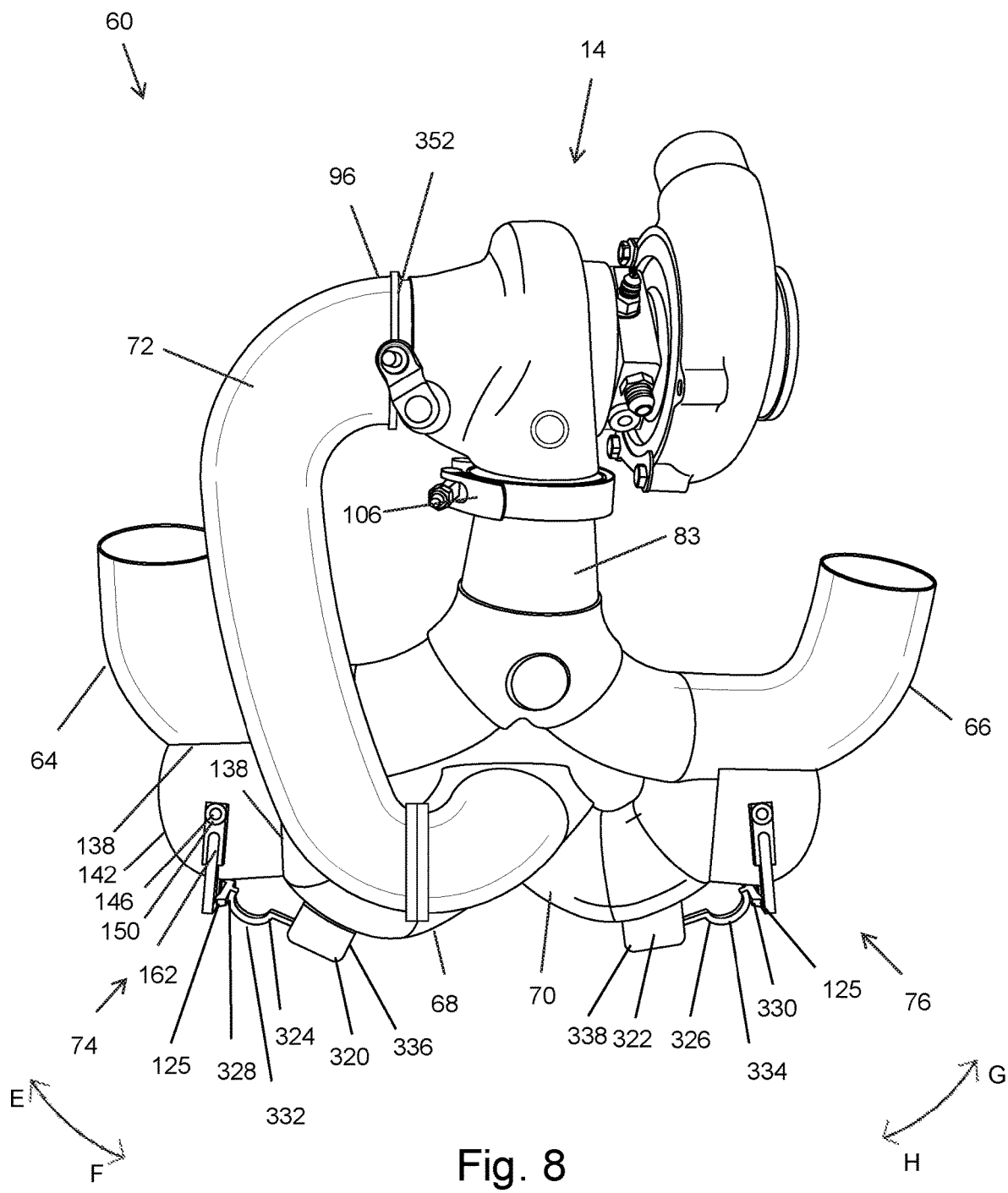
FIG. 8 is a rear perspective view of the manifold of FIG. 7 shown with a first turbocharger.
Figure 9:
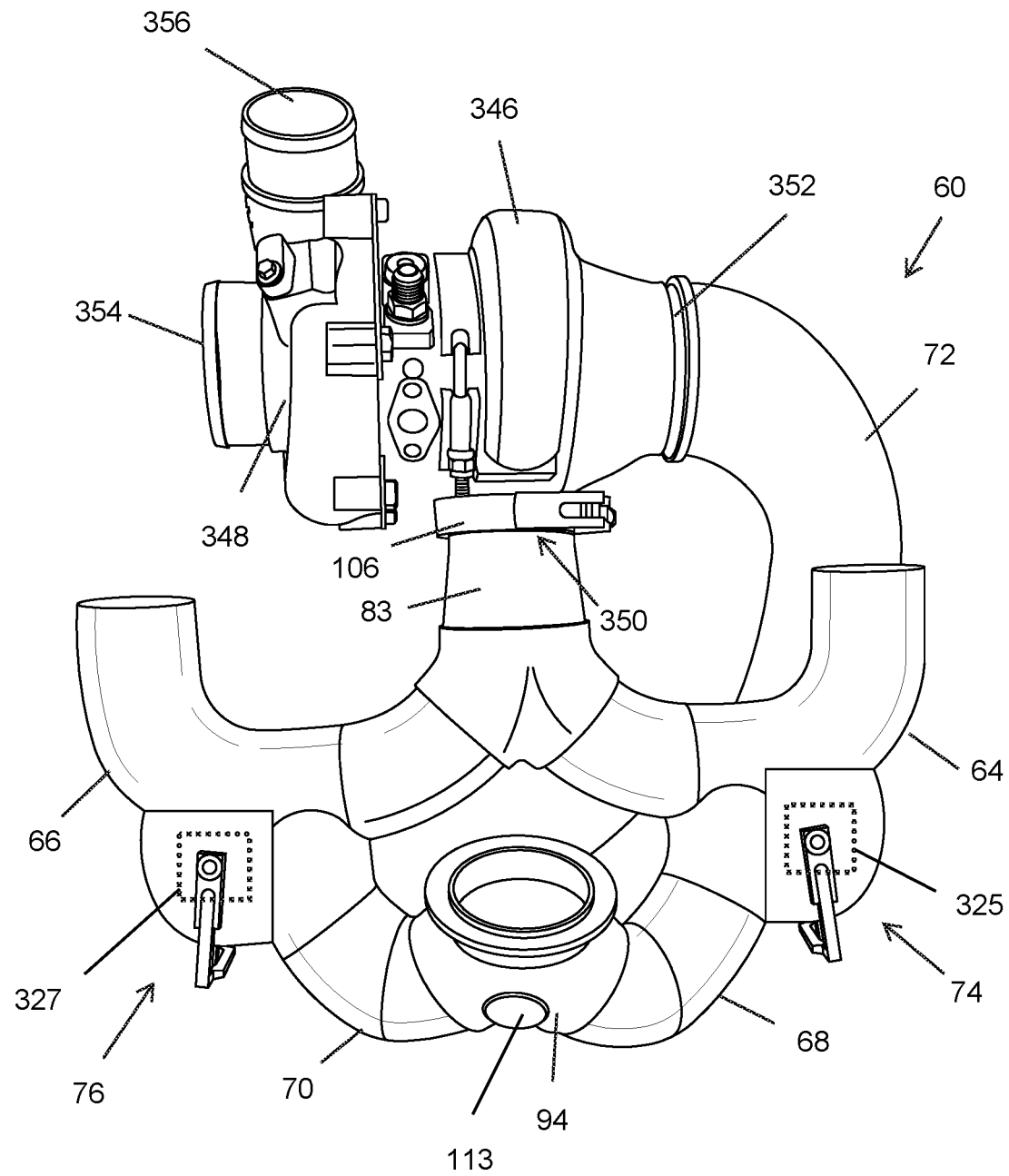
FIG. 9 is a front view of the manifold of FIG. 8 shown with the first turbocharger.
Figure 10:
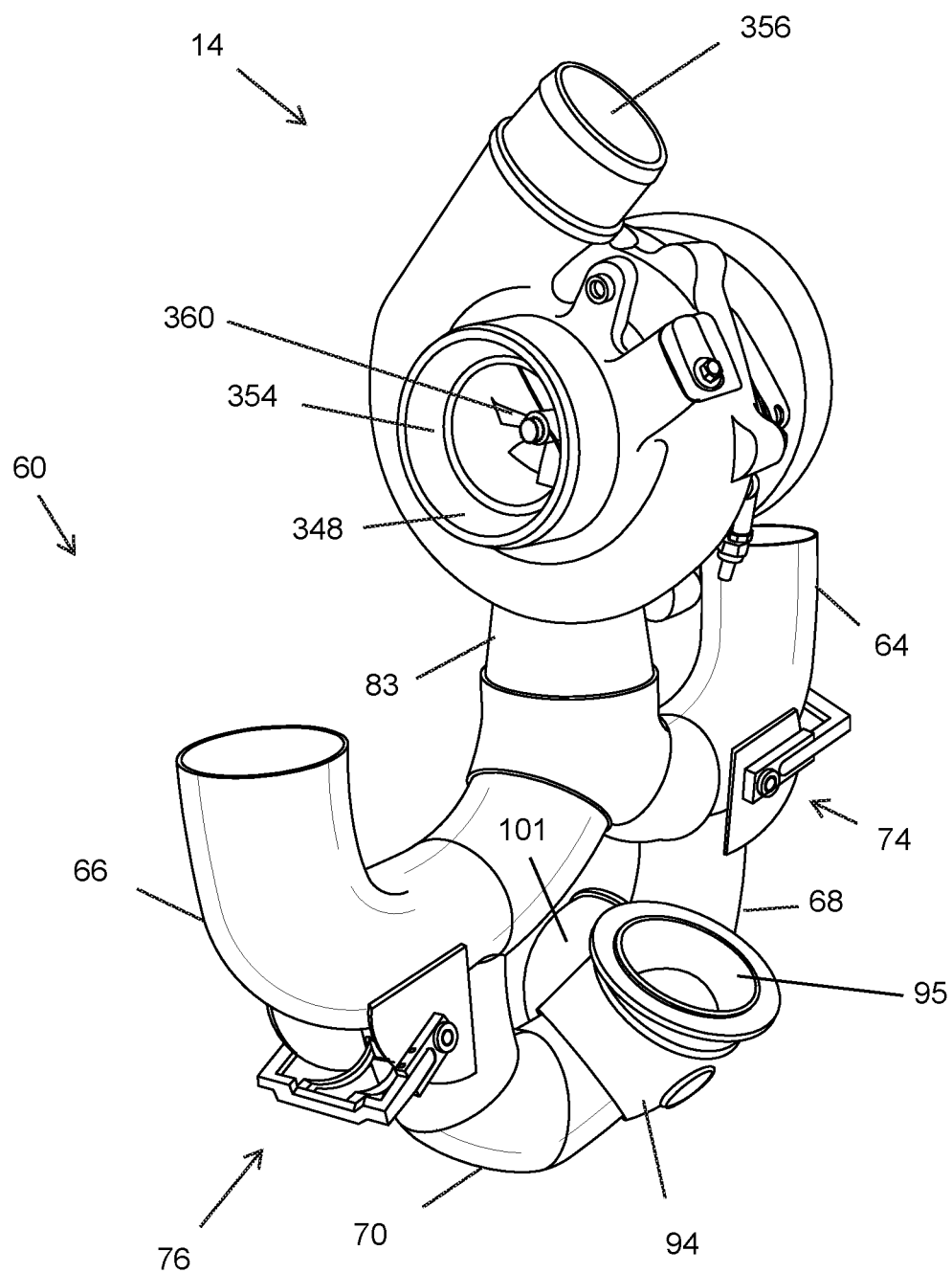
FIG. 10 is a side perspective view of the manifold of FIG. 8 shown with the first turbocharger.

FIGS. 4 through 11B, show an embodiment of the manifold 60 of FIG. 3 using the same figure labels for the same parts. FIGS. 4 to 6, 10, 11A do not show the fifth exhaust conduit 72, which is shown in FIGS. 7 through 9. In some embodiments the first and third exhaust conduits 64, 66 form a w-shape as shown in FIG. 4. In some embodiments the second and fourth exhaust conduits 68, 70 form a u-shape as shown in FIG. 4.

In some embodiments, a first turbocharger outlet section 83 extends from the intersection 84 for connecting with the exhaust intake port 350 of the first turbocharger.

In some embodiments, the first ends 79 and 81 of the first and third exhaust conduits comprise flanges (not shown) for joining the first and second exhaust conduits with an exhaust manifold(s) or header(s) of the engine. In some embodiments, a flange 97 is mounted to or adjacent the fourth intersection for joining the third, fourth, and fifth exhaust conduits to the exhaust intake port 108 of the second turbocharger 16.

As shown in FIG. 5, the intersection 94 and/or a portion extending from the intersection, and the opening 102 of the outlet 95, is angled forward from the angle of the first turbocharger outlet section 83. Therefore, the second turbocharger 16 when mounted at the flange 97 is forward of the outlet section 83 and the first and third exhaust conduits 64, 66, as further shown in FIGS. 11A and 11B.

FIG. 8 shows an example first turbocharger 14 mounted to the outlet section 83 of the turbo charger manifold with a clamp 106 at an exhaust inlet port 350 of the turbocharger. In some embodiment the clamp is a v-band clamp. The first end 96 of the fifth exhaust conduit 72 is connected to an exhaust outlet 352 of the turbocharger 14. Therefore, the exhaust gas exiting the first turbocharger is directed to the exhaust inlet of the second turbocharger 16 via the intersection 94 and the outlet 95.

Figure 11A:
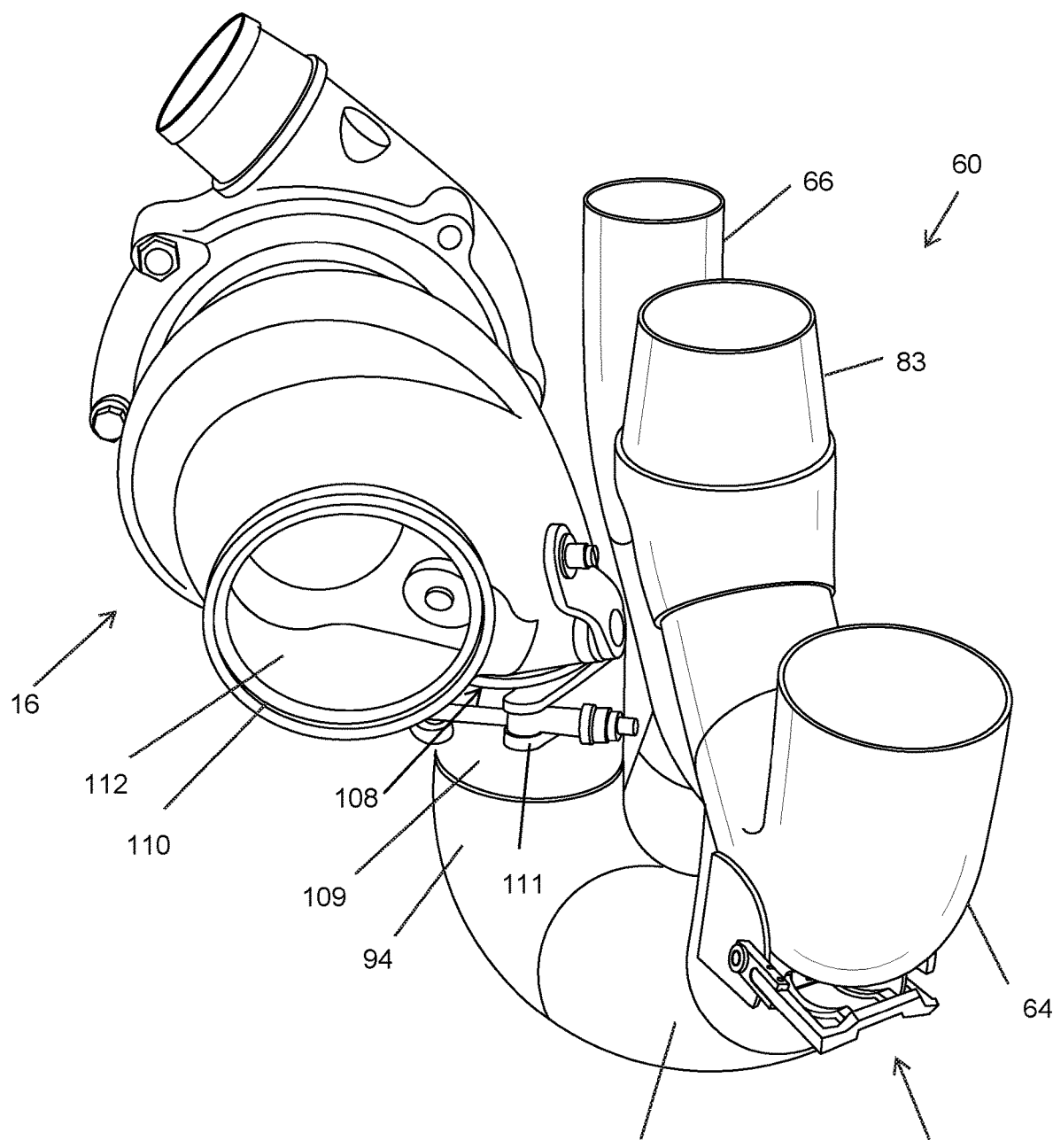
FIG. 11A is a side perspective view of the manifold of FIG. 4 shown with a second turbocharger.
Figure 11B:
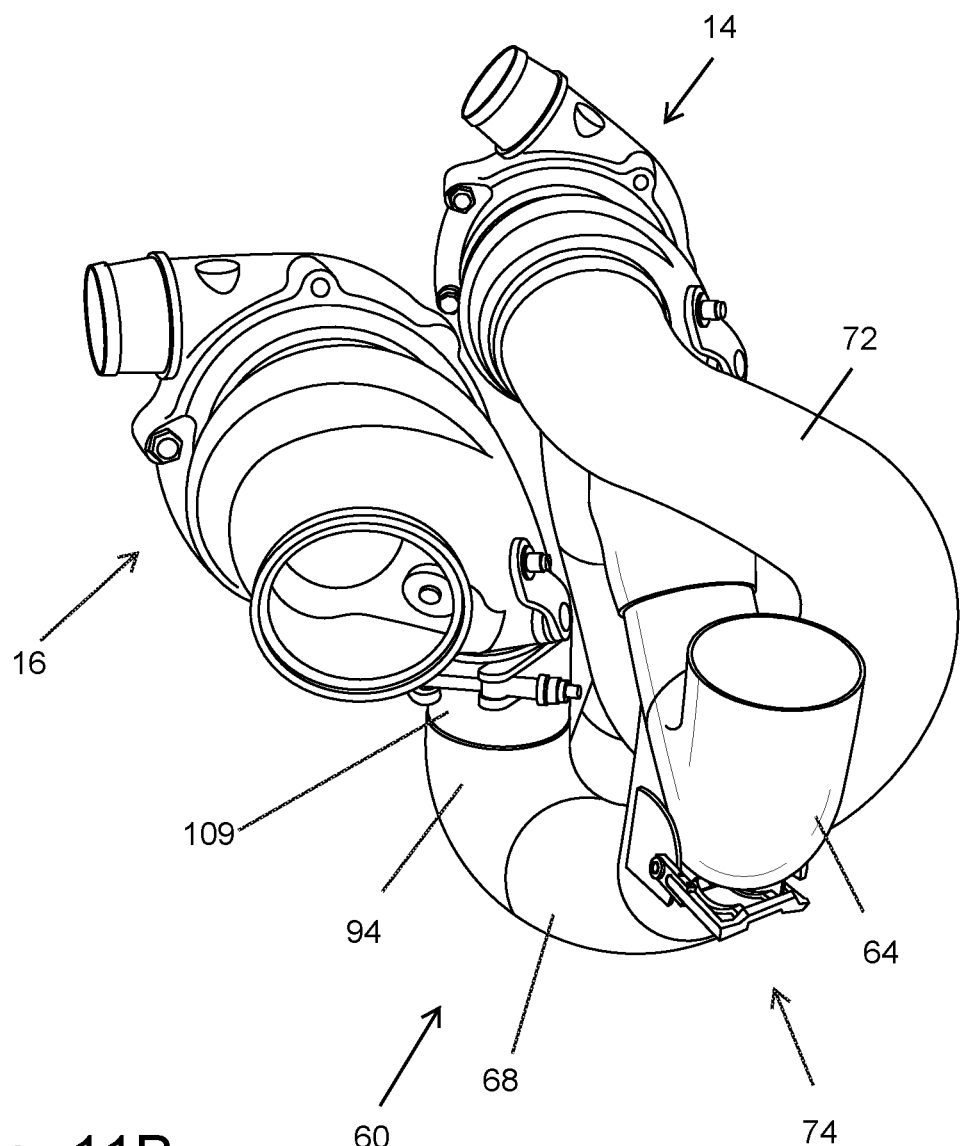
FIG. 11B is a side perspective view of the manifold of FIG. 4 shown with the first turbocharger and the second turbocharger.

FIGS. 11A and 11B shows an example second turbocharger 16 connected at the second turbocharger outlet 95. An extension 109 is added to raise the second turbocharger outlet 95 above the intersection 94. The extension 109 can be integrally formed with the intersection 94. The exhaust intake port 108 of the second turbocharger 16 is connected to the second turbocharger outlet 95 with a clamp 111, such as a v-band. In some applications, a further exhaust pipe 100 is connected to the exhaust outlet fitting 110 of the exhaust exit 112. In some embodiments, an extension 109 can be used to position the second turbocharger in the desired position.

FIG. 11B shows the first turbocharger 14 and the second turbocharger 16 mounted to the manifold 60, with the bridge conduit 72 connected to the first turbocharger. FIG. 11B shows an exemplary application where the first turbocharger 14 is smaller than the second turbocharger 16.

FIGS. 12 to 15 show a section of the manifold 60 comprising valve 74 and a portion of exhaust conduits 64, 68. Valve 76 at the intersection of exhaust conduits 66, 70 is the same as valve 74 at the intersection of exhaust conduits 64, 68, except it valve 76 rotated 180 degrees about a mid-plane 114 (FIG. 7) bisecting the manifold 60. Therefore, only valve 74 will be described in detail.

The valve comprises a door 116 and an arm mechanism 117. The arm mechanism comprising a first and second door arms 118, 120, and a first and second mount arms 122, 124, and a connecting bar 125. Distal ends 126, 128 of the respective mount arms 122, 124 are pivotally mounted to respective side mounting plates 130, 132.

Figure 12:
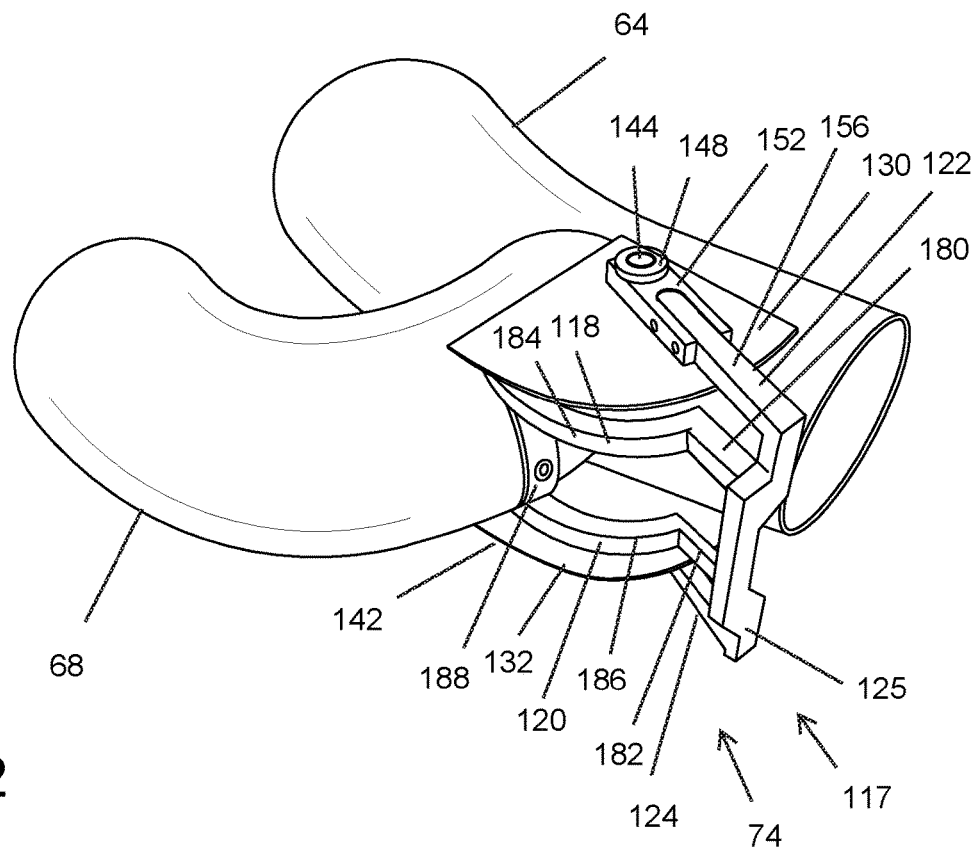
FIG. 12 is a side perspective view of a portion of the manifold of FIG. 4 comprising a valve.

The side mounting plates 130, 132 are attached at and adjacent the intersection of exhaust conduits 64 and 68. The plates create a semi enclosed space 134 between the intersecting exhaust conduits as shown in FIGS. 12, 14, and 15 at a corner of the intersection. In some embodiments, the mounting plates are joined to the respective conduits 64, 68 at or adjacent first edges 136, 138 of the respective plate. Between the first edges of each plate is a second curved edge 140, 142. The curved edges 140, 142 extend from exhaust conduit 64 to exhaust conduit 68.

The mount arm 122 is located on the outside side of plate 130 and mount arm 124 is located on the outside side of the plate 132. The door arms 118, 120 are located between the plates 130, 132 and between arms 122, 124.

The plates 130, 132 comprise an aperture (not shown) where pins 144, 146 are mounted. The pivot pins extend through apertures (not shown) in the respective arms 122, 124. The pins have heads or outside washers 148, 150 that are larger than the apertures in the respective arms 122, 124. The heads or washers are formed with or fixed to the pins to secure the arms 122, 124 to the respective pins 144, 146 and therefore pivotally to the respective plates 130, 132. In some embodiments, the plates 130, 132 do not have apertures at the pins and the pins are fixed to the outside surface of the respective plates.

In some embodiments, each of the mount arms 122, 124 comprise a first arm portion 152, 154 and a second arm portion 156, 158. The first arm portions 152, 154 each comprise a mouth 160, 162. The second arm portion 156, 158 is received into the respective mouth 160, 162. In some embodiments the mouth 160, 162 covers the second arm portion on at least a portion of two sides. The second arm portion is shaped and sized to be received into the respective mouth. In some embodiments, fasteners, such as bolts or bolt and nut combinations or screws, 164, 166, 168, 170 join the second arm portion to the respective mouth.

In some embodiments, the second arm portions 156, 158, the connecting bar 125, and the door arms 118, 120 are formed of a unitary piece of material.

The connection bar 125 extends transverse to the second arm portions 156, 158, the mount arms 122, 124, and the door arms 118, 120. In some embodiments, the connection bar 125 is perpendicular to the second arm portions 156, 158, the mount arms 122, 124, and the door arms 118, 120. The door arms 118, 120 join to the connection bar 125 inward of and between the mount arms 122, 124.

In some embodiments, the connection bar 125 comprises offset portion 172 between opposite end portions 174, 176. The offset portion 172 is offset from the end portions 174, 176. The offset portion 173 provides a back recess 178 that can accommodate the conduit 64 and allow a greater range of motion of the connecting bar, the door, and the valve.

In some embodiments, the door arms 118, 120 each comprise a first portion 180, 182 and a second curved portion 184, 186. The first portions are non-curved and joined to the respective curved portions. A door mount 188 is connected to the door arms 118, 120 opposite the connecting bar 125. The door mount 188 is fixed to the door 116. In some embodiments the door mount 188 is fixed to the door 116 with a fastener 190, such as a bolt or screw. The door mount comprises a concave curve and profile between the door arms 118, 120. The door arms can be fixed to the door mount with fasteners 192, 194, such as pins.

The door arms 118, 120 extend through or are moveable through, depending on the position of the valve, an arm aperture 196 in the exhaust conduit 68.

Figure 16:
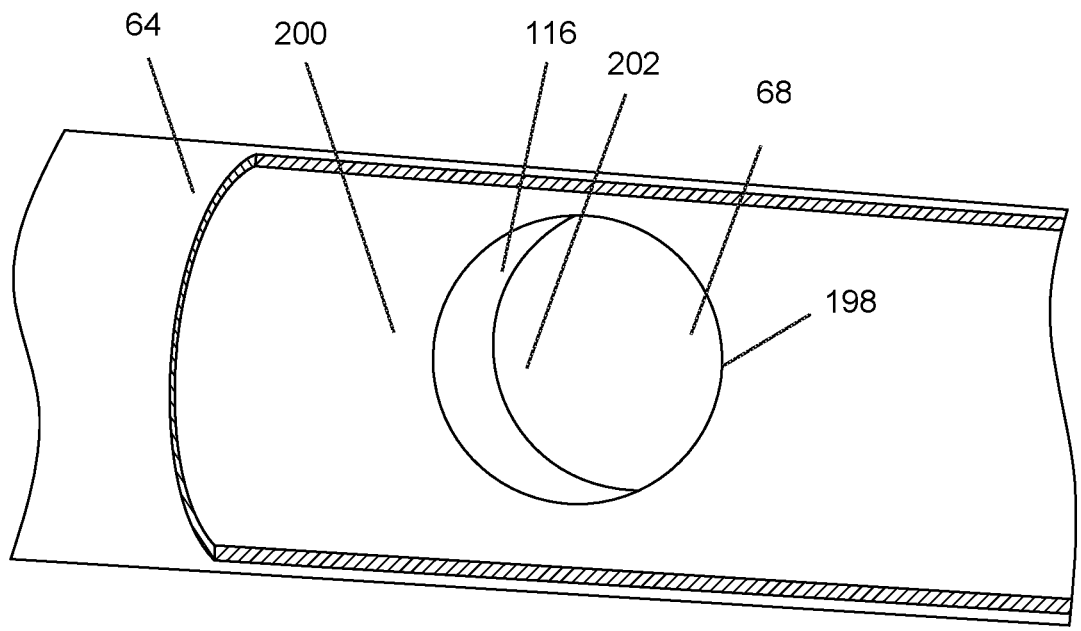
FIG. 16 is a top cut out view of an intersection of conduits of the portion of the manifold of FIG. 12 with the valve in an open position.
Figure 17:
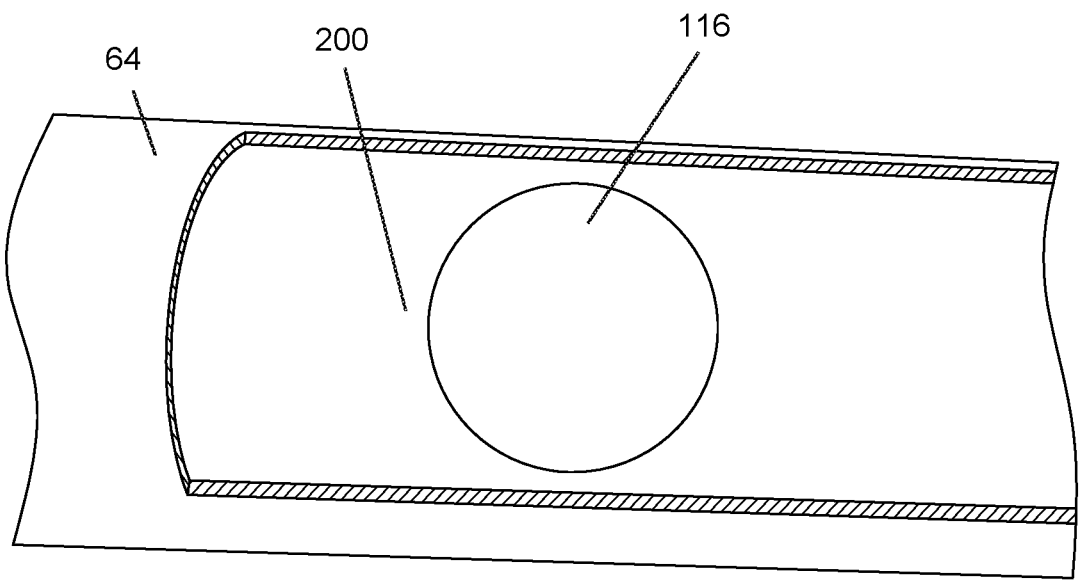
FIG. 17 is a top cut out view of the intersection of conduits of the portion of the manifold of FIG. 12 with the valve in a closed position.

FIGS. 16 and 17 show a cutout view of the intersection of the exhaust conduits 64 and 68 showing an interior of the conduit 64 and conduit 68 (FIG. 16). An interior bottom portion 200 of exhaust conduit 64 comprises a bypass aperture 198 providing access to exhaust conduit 68. In FIG. 17, the door 116 of valve 74 is in a closed position, covering the bypass aperture 198 and closing and blocking exhaust gas access to the exhaust conduit 68 from exhaust conduit 64. In FIG. 16, the door 116 of valve 74 is an open position, where the door is against or adjacent an interior sidewall 202 of the conduit 68, and the aperture 198 is open allowing exhaust gas access from the exhaust conduit 64 to the exhaust conduit 68.

Figure 13:
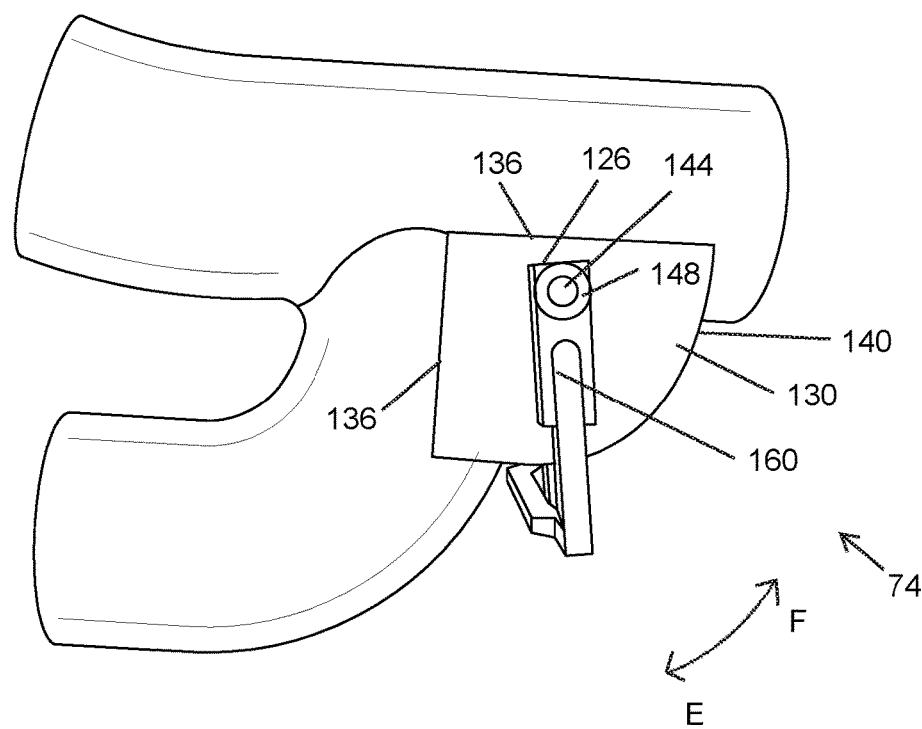
FIG. 13 is a side view of the portion of the manifold of FIG. 12 comprising the valve.

The valve, arm mechanism, and door are shown in an open position in FIGS. 12 and 14 and in a closed position in FIGS. 13 and 15. In FIG. 14, the door arms extend through arm aperture 196 and into conduit 68. All or a substantial portion of the curved portion 184, 186 are within the conduit 68 when the valve is in the closed position. The curved portions 184, 186 cause the door to move to cover the aperture 198 when the valve is moved to the closed position.

Figure 18:
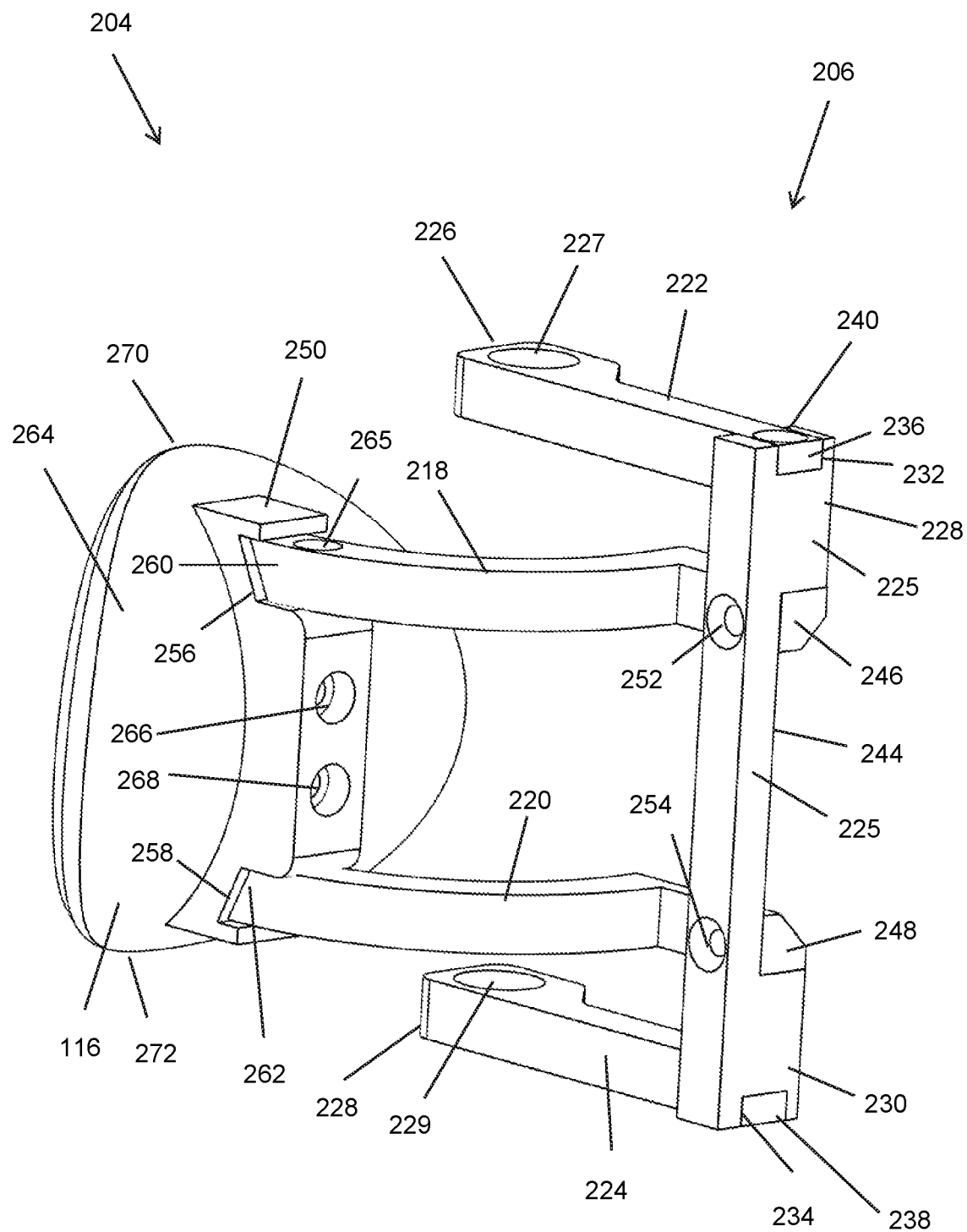
FIG. 18 is a perspective view of a second embodiment valve usable with the manifold embodiments of FIGS. 2 and 4.
Figure 19:
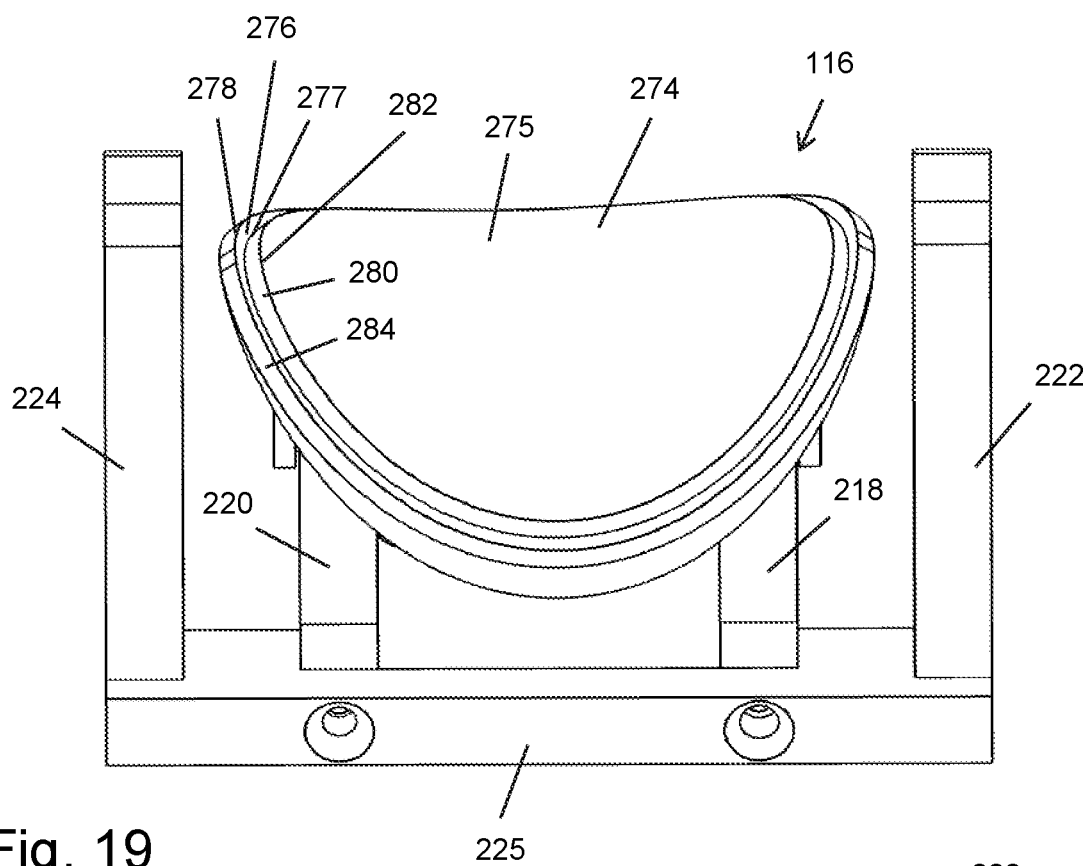
FIG. 19 is a side perspective view of the valve of FIG. 18.
Figure 20:
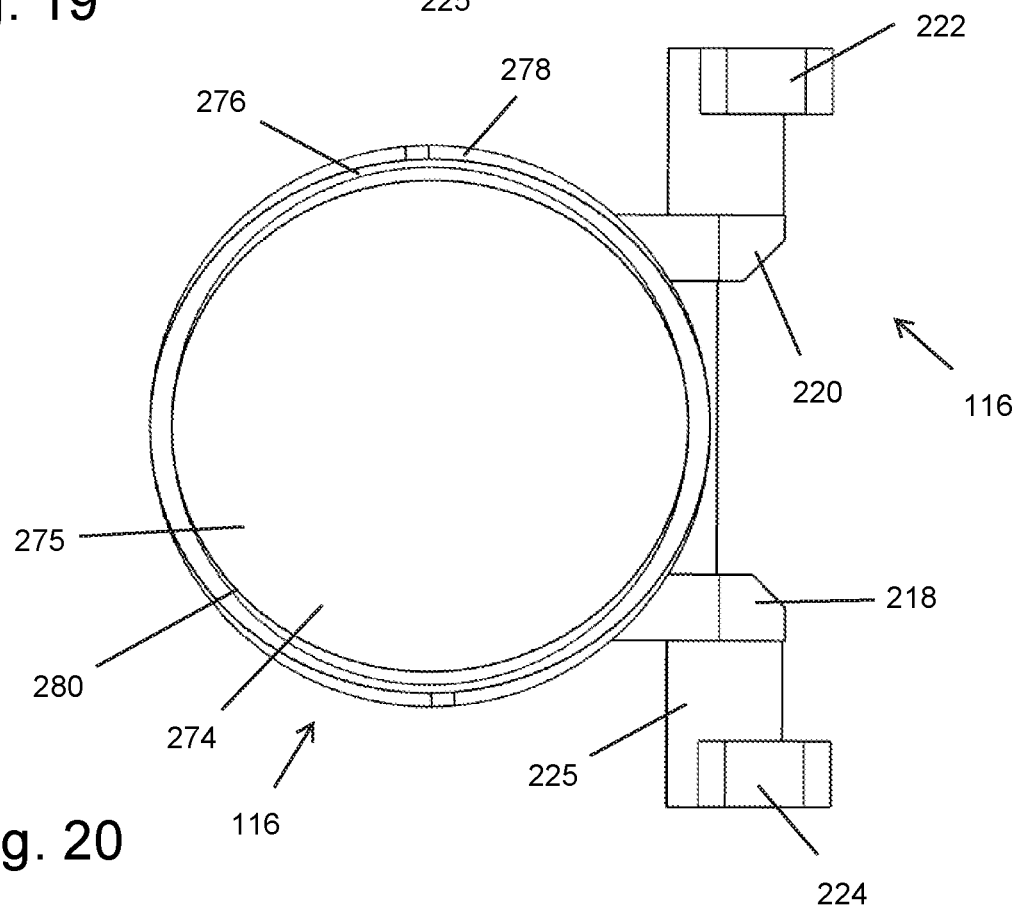
FIG. 20 is a second side view of the valve of FIG. 18.

FIGS. 18 to 20 show a second embodiment valve 204 that can be used in place of valve 74, 76, and/or 28. The second embodiment valve 204 comprises the same door 116 as valve 74. The valve 204 comprises an arm mechanism 206 that is similar to the arm mechanism 117, except as shown and described.

The arm mechanism 206 comprises a first and second door arms 218, 220, and a first and second mount arms 222, 224, and a connecting bar 225. Distal ends 226, 228 of the respective mount arms 222, 224 are pivotally mounted to respective side mounting plates 130, 132 at apertures 227, 229 with pins 144, 146 as described with valve 74.

The connection bar 225 comprises an offset portion 225 between opposite end portions 228, 230. The end portions 228, 230 each comprise recesses 232, 234. The end recess 232, 234 receives terminal ends 236, 238 of the mount arms 222, 224. The mount arms may be fixed to the connection bar 225 at the terminal ends 236, 238 with fasteners, such as bolts or screws 240.

Ends 246, 248 of the door arms opposite the door mount 250 are mounted to the connection bar 225 within the recess 244 by fasteners (not shown) at apertures 252, 254. The door mount 250 comprises recesses 256, 258 for receiving ends 260, 262 of the door arms, which can be fixed thereto with fasteners at apertures 265. The door mount is mounted to the back 264 of the door 116 at apertures 266, 268 with fasteners. The door 116 has a concave profile from a first side 272 to a second side 273. The concave curve and profile conforms to the curve and profile of the bottom 200 of the conduit 64.

FIGS. 19, 20 and 21 show the interior side 274 of the door 116. In some embodiments, the interior side 274 comprises a perimeter recess 276. The perimeter recess 276 is recessed from the main surface 275 of the interior side 274. The first wall 280 between the recess 276 and the main surface comprises a top edge 282 and a bottom edge 277. At the outer edge 278 of the recess 276 is an outer sidewall 284, which may be angled. In some applications, the perimeter recess contacts the exterior side of conduit 64 within conduit 68 about the aperture 198, and the main surface 275 is within the aperture 198, when closed.

FIGS. 22 and 23 show a cover 290. The cover is for coving around the arm aperture 196 in the conduit 68. The cover has arm apertures 292, 294 for the door arms 118, 120, or 218, 220 respectively to extend through. Therefore, the connecting bar 125, 225 and the mount arms 122, 124 are outside of the cover, while a portion of the door arms 118, 120, 218, 220 are inside 296 of the cover when in use.

In some embodiment, the 290 cover has a rectangular shape. The cover has a front wall 298 and sidewalls 300, 302, 304, 306. The longer first and second sidewalls 300, 302 have a concave cut-outs 308, 310, and are concave between the third and fourth sidewalls 304, 306. Therefore, the first and second sidewalls 300, 302 have a concave curved back edge 312, 314 opposite the front wall 298. The back edges 316, 318 of the third and fourth sidewalls 300, 302 opposite the front wall 298 are beveled toward the inside 296 as shown in FIG. 22. The concave back edges 312, 314 allow the cover to conform to the curvature of the outside wall of the conduit 68 in the general directions A and B of FIG. 15 adjacent the arm aperture 196 along the aperture's 196 longer length. The beveled back edges 316, 318 allow the cover to conform to the curvature of the outside wall of the conduit 68 adjacent the arm aperture 196 along the aperture's 196 shorter width.

In some embodiments, the arm apertures 292, 294 are sized to closely fit around the door arms, either by surface-to-surface contact about the door arm at the points of intersection or by being closely adjacent thereto. The close fit can seal against gas escape from the cover and the exhaust conduit 68 if gas passes through the arm aperture 196 into the inside of the cover. Further, the cover can be mechanically held against conduit 68 about the arm aperture 196 with a fastener, such as a clamp, or adhesive. Therefore, the edges 312, 314, 316, 318 can contact and seal to the outside surface of the conduit 68 about the arm aperture 196.

As shown in FIG. 8, in some embodiments, the manifold 60 comprises or has attached actuators 320, 322 for moving the arm mechanism 117 of valves 74 and 76 between, to, and from the closed position and the open position. In some embodiments, the actuators are linear actuators. The actuators comprise a moveable rod 324, 326. The terminal end of the rod 324, 326 are connected 328, 330 attached to the connecting bar 125, 225 of valves 74, 76. In some embodiments, the connection 328, 330 is a hinged or pivot connection which allows the terminal end of the rod 324, 326 to pivot relative to the connecting bar 125, 225 as the valve moves between closed and open positions in the directions F and E for valve 74 and H and G for valve 76. The valves 74, 76 are shown in or close to the closed position in FIG. 8. Therefore, when the rods of the actuators are in a retracted position, the valves are in a closed position. When the rods of the actuators are extended to an extended position, the valves are in the open position, with the door 116 of the valves 76, 74 adjacent or against the inside wall of conduits 68, 70, and the respective apertures between conduit 64 and 68 and conduits 66 and 70 open. In some embodiments, the rods can move in an arc motion to follow the arc motion of the connecting bar 125, 225 moving along the path defined by its connection via the mount arms 122, 124, 222, 224 to the pins 144, 146 and the plates 130, 132. In some embodiments, the rods comprise a curved portion 332, 334 and a straight portion as shown in FIG. 8. The straight portion is adjacent the actuator housing 336, 338. The curved portions 332, 334 assist or allow in following the curved path of the connecting bar 125, 225 from and to the open and closed positions.

In some embodiments, the actuators are pressure or vacuum operated. In some embodiments, pressure operated actuators comprise a chamber comprising a diaphragm and a spring biasing the diaphragm to a first position corresponding to a retracted position of the rod 324, 326. The diaphragm operatively moves the rod from the retracted position to an extended position when a predefined open pressure is applied to the diaphragm to overcome the spring bias of the spring. When pressure drops below the predefined open pressure, the spring overcomes the pressure to move the diaphragm back toward and to the first position and therefore retracts the rod to the retracted position. In some embodiments, pressure supplied to the actuators is pressure from the manifold 10, 60 ahead of the first turbocharger. This pressure may be known as exhaust back pressure. Therefore, a pressure control conduit (not shown) can extend from conduit 64, 64 or 24 to the actuator. The actuation of the actuators and therefore the positions of the valves can be controlled by based on the pressure in the manifold 10, 60 upstream of the first turbocharger.

When the actuator is vacuum operated, vacuum is applied and/or released from one side of the diaphragm causing the diaphragm to move, which causes the operatively connected rod to move.

In some embodiments, the actuators are electro-mechanical linear actuators. In some embodiments, the electro-mechanical linear actuators comprise a motor and a gear mechanism, such as a leader screw and a nut. The leader screw comprises threads. A nut is operably fixed to the movable rod and engaged to the threads of the leader screw. The rotation of the lead screw by the motor is a first rotation direction causes the nut to move in a first linear direction along the screw, thus moving the rod with it in the first linear direction. The rotation of the screw by the motor in a second rotation direction opposite the first rotation direction causes the nut to move in a second linear direction opposite the first linear direction along the screw, thus moving the rod with the nut in the second linear direction opposite the first linear direction. Therefore, powering the motor to rotate in one direction causes the rod to extend and powering the motor to rotate in the opposite direction causes the rod to retract.

In some embodiments, the actuator that controls each valve 74, 76 is a motor 325, 327 (shown diagrammatically in FIG. 9), such as a servomotor. Each motor is connected to the respective pins 144, 146 or to the respective arms 122, 124, 222, 224 at or about the pins to rotate the arms from and to the open and closed positions for each respective valve 74, 76.

Figure 24:
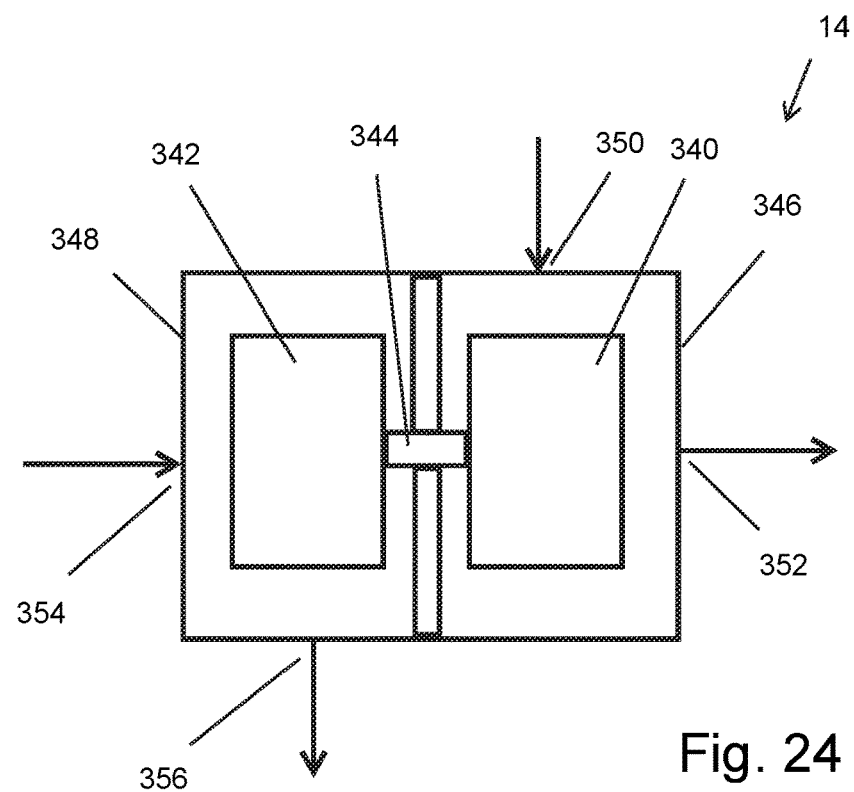
FIG. 24 is a block diagram of the turbocharger of FIG. 8.

FIG. 24 shows an exemplary block diagram of turbocharger 14, which, in some embodiments, is the same as turbocharger 16. The turbocharger 14 comprises a turbine 340 and a compressor 342. The turbine 340 is connected to the compressor such as by a shaft 344. The turbine drives the compressor. The turbine is rotated by the force of exhaust gas from the engine 12 passing through the turbine housing 346 from an exhaust inlet 350 to an exhaust outlet 352. The exhaust gas turns the turbine which is connected to the shaft 344 which turns the compressor 342. The compressor 342 receives ambient air from an inlet 354 and forces the air out the forced air outlet 356 of the compressor housing 348. The compressor compresses the air forced out of the air outlet 356 at a pressure higher than atmospheric pressure.

In some embodiments, the turbine comprises turbine fan blades (not shown) for capturing the momentum of the exhaust air flowing through the turbine housing and causing the turbine to rotate. The turbine housing directs the exhaust gas to follow through and spin the turbine.

In some embodiments, the compressor is a centrifugal compressor comprising an impeller and a diffuser. The impeller raises the energy of the intake air. The diffuser is downstream of the impeller and coverts the kinetic energy of the air/gas into pressure by slowing the gas velocity. A collector is downstream of the diffuser to gather the flow of air/gas from the diffuser and deliver this flow to a downstream conduit, which may be joined to the outlet 356. The outlet 356 of the compressor is connected to the intake manifold at 390 of the engine 12.

Figure 25:
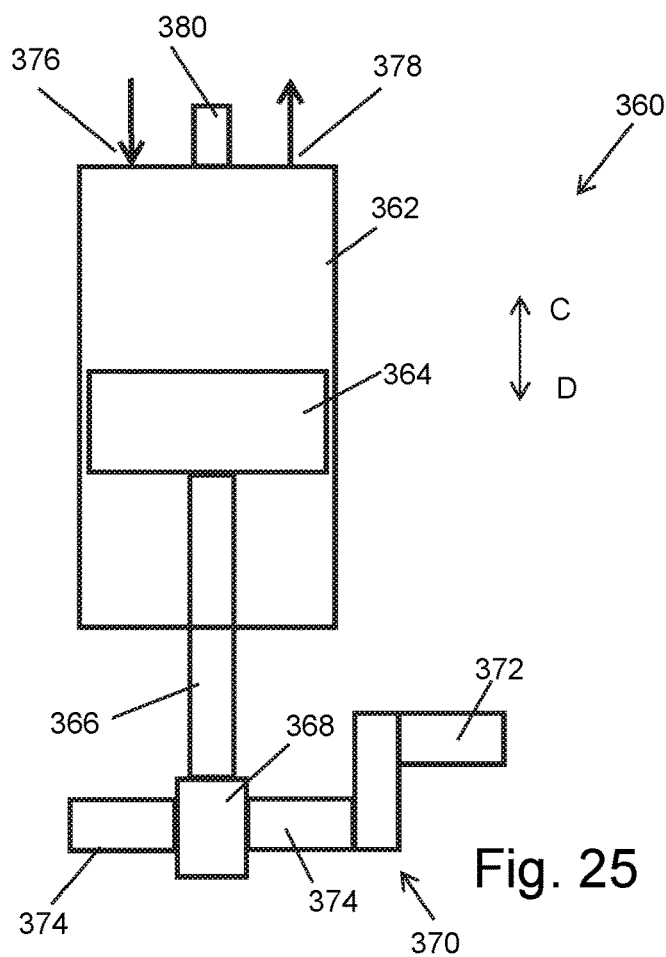
FIG. 25 is a block diagram of selected components of an engine.

FIG. 25 shows a block diagram of a portion 360 of the engine 12 including a cylinder 362, and a portion of a crankshaft 370. The engine may have any number of cylinders, such as 2, 3, 4, 5, 6, 8, 10, or 12 cylinders. The cylinder 362 comprises a piston 364 connected to a connecting rod 366. The connecting rod 366 is rotatably connected at a terminal end 368 to a crankpin 374 of a crankshaft 370 (partially shown in FIG. 25). The crankshaft 370 is journaled to rotate in the engine block of the engine at block journal location 372 on the crankshaft where the engine main bearings are located between the crankshaft and the engine block.

The cylinder has four cycles: an intake, compression, combustion, and exhaust cycles. During the intake cycle, the intake valve or valves (not shown) are opened to allow air and fuel to enter the cylinder 362 through an intake opening 376 and the piston is drawn down in direction D by the crankshaft to draw air and fuel into the cylinder. The forced air from the turbocharger increases the density of the intake gas/air entering cylinder during the intake cycle. The increase in density of the intake gas/air allows more power per engine cycle.

Figure 29:
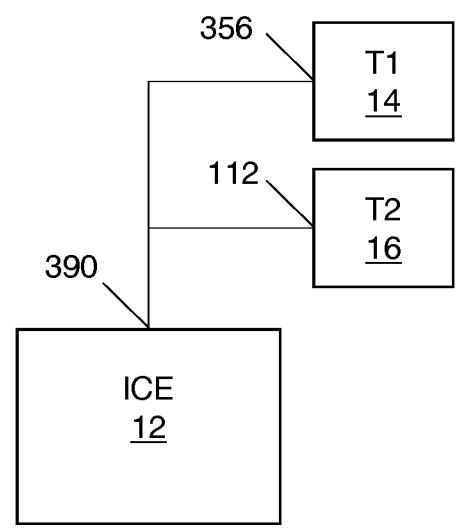
FIG. 29 is a block diagram of a portion of the engine systems of FIG. 1 or 3 showing turbocharger compressor output to the engine.

FIG. 29 is a block diagram showing that the compressed/forced air of the compressor of the turbochargers 14, 16 is routed to the engine, usually through an engine intake manifold at 390. The output of the compressors of the turbochargers 14, 16 are routed to intake opening of the cylinders of the engine.

At the end of the intake cycle the intake valve or valves are closed and the crankshaft drives the piston upward in the direction C to compress the air and fuel within the cylinder above the piston. When the piston is at or about the top of its up and down travel allowed by the rotation of the crankshaft, a spark is provided at the spark plug 380, which extends into the top of the cylinder. The spark ignites the air fuel mixture compressed in the cylinder above the piston, causing fuel to burn and release energy driving the piston downward in the direction D, and driving the crankshaft to rotate. When the piston reaches the bottom of its up and down travel, one or more exhaust valves (not shown) will open to allow exhaust gas to exit the cylinder through an exhaust opening 378. The exhaust gas will be received in an engine exhaust manifold or headers. The engine exhaust manifold or headers are connected to the turbocharger manifold at exhaust inlets 75, 77 or 39. Therefore, the turbocharger manifold receives the exhaust gas from the engine.

In some applications, an engine will have two exhaust manifolds, a first exhaust manifold for receiving exhaust from a first set of cylinders of the engine and the second exhaust manifold for receiving exhaust from a second set of cylinders of the engine. Therefore, the two inlets 75 and 77 allow the turbo manifold 60 to receive exhaust exiting from two exhaust manifolds.

In some applications, one engine exhaust manifold may have two exit openings. Therefore, each of the openings can be connected to one of the inlets 75, 77 so that the turbocharger manifold 60 can collect all of the exhaust gas from the engine.

Figure 26:
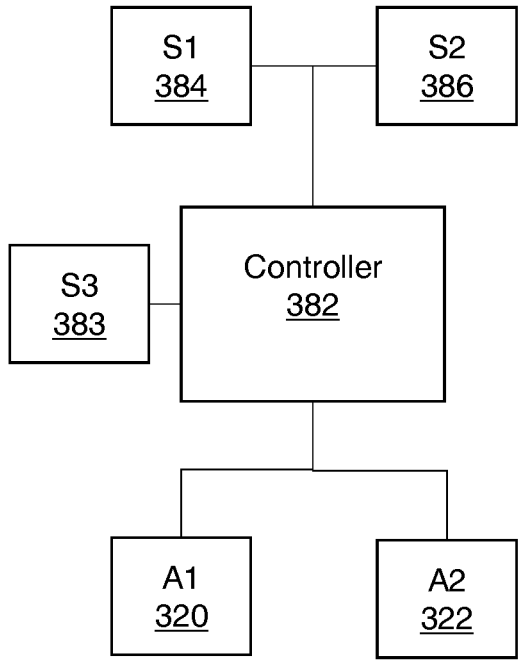
FIG. 26 is a block diagram of a controller, sensors, and actuators of the manifold of FIG. 4.
Figure 27:
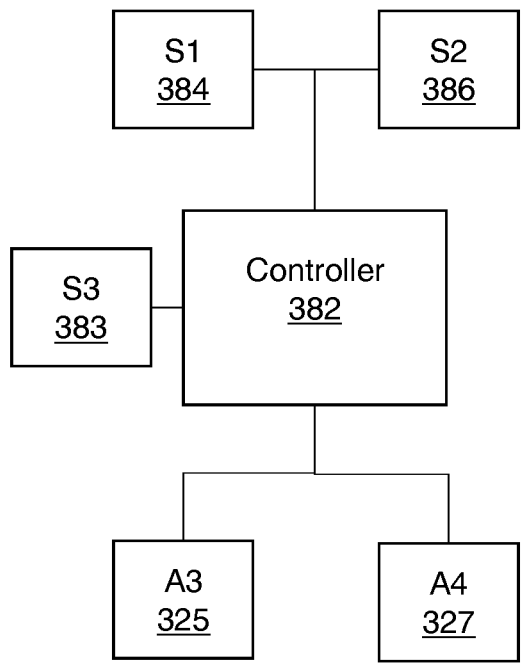
FIG. 27 is a second block diagram of a controller, sensors, and second embodiment actuators of the manifold of FIG. 4.
Figure 28:
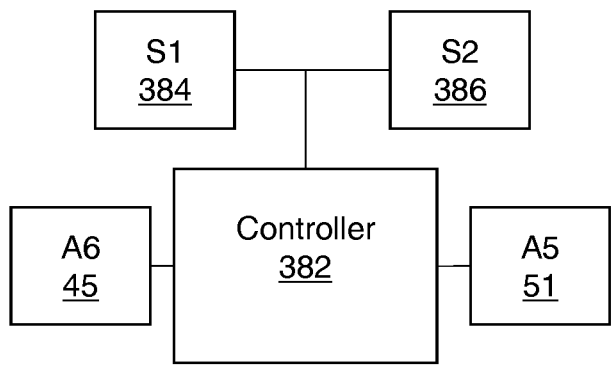
FIG. 28 is a block diagram of a controller, sensors, and actuator of the manifold of FIG. 1.

In some embodiments, a controller 382 controls the operation of the actuators 320, 322 or 325, 327, or 51, 45 to control the position of the valves 74, 76, or 28. The controller 382 is connected by wire or wireless connection to a pressure sensor and/or a turbo speed sensor as shown in FIG. 26. The controller is connected by wire or wireless connection to the actuators 320, 322 or 325, 327 in the case of manifold 60 or actuator 51 or 45 in the case of manifold 10. The controller is configured to send control signals and/or power to direct the movement of the actuators. In some embodiments, the control signals and/or power are sent based on the data received from the one or both of the sensors 384, 386.

In operation, the controller is configured to and will instruct and/or power the actuators to move or position the valves 28, 74, 76 to the closed position at lower engine operating speeds up to a predefined open threshold. In the case where the actuators 320, 322, 51 are pressure or vacuum operated, the actuators are configured to maintain the valves in a closed position at pressure or vacuum corresponding to lower engine operating speeds up to the predefined open threshold.

Therefore, all of the exhaust gas will be directed via conduits 64 and 66, in the case of manifold 60 or conduit 22 in the case of manifold 10, to the first turbocharger 14. When the predefined open threshold is reached, the valves 28, 74, 76 are opened, to allow some of the exhaust gas to travel in conduits 68, 70 in the case of manifold 60 and conduit 24 in the case of manifold 10, to the second turbocharger 16. In the case where the actuators 320, 322, 51 are pressure or vacuum operated, the actuators are configured to move the valves 28, 74, 76 to the open position when the pressure or vacuum corresponding to the predefined open threshold is reached. In the case of the use of a controller 283 to control the actuators, the controller is configured to and will instruct and/or power the actuators to move or position the valves 28 74, 76 to the open position when the predefined open threshold is reached or exceeded.

The turbocharger manifolds 10, 60 direct the exhaust gas exiting the first turbocharger 14 to the second turbocharger 16 via conduits 26 and 72 to the second turbocharger 16 even when the valves 28 74, 76 are closed.

In some embodiments, the predefined open threshold is set at the peak efficiency threshold of the first turbocharger 14. The peak efficiency can be correlated to a speed of rotation of the turbocharger and/or a manifold pressure leading up to the first turbocharger in the turbocharger manifold 60.

In some embodiments, the turbocharger 14 comprises a speed sensor 384 that measures and reports the rotational speed of the compressor and/or the turbine of the turbocharger 14 to the controller 382. In some embodiments, the turbocharger 16 comprises a speed sensor 383 that measures and reports the rotational speed of the compressor and/or the turbine of the turbocharger 16 to the controller 382.

In some embodiments, conduits 22, 64, and/or 66 comprise a pressure sensor 386 that measures and reports the pressure within the respective conduit. Therefore, the pressure sensor 386 can measure the pressure in the turbocharger manifold upstream of the first turbocharger 14. The pressure sensor can be mounted to extend into the conduit to measure the pressure. The connection between the sensor and the conduit will be air-tight.

Therefore, when a predefined open rotation speed of the first turbocharger 14 is reached or exceeded as reported by the speed sensor 384 and/or a predefined open manifold pressure is reached or exceeded in the manifold exhaust conduit(s) upstream of the first turbocharger as reported by sensor(s) 386, the valves 28 74, 76 will open. Before and below such predefined open speed and/or such predefined open manifold pressure is reached valves are and remain closed.

In this manner all or substantially all of the exhaust gas from the engine is directed into the first turbo until the predefined open threshold(s) are reached. After a one or more of the open threshold(s) are reached the valves 28, 74, 76 are opened to divert some of the exhaust gas from reaching the first turbo charger and directing it through conduits 24, 68, 70 to the second turbocharger 16.

In some applications, the actuators open or the controller is configured to direct the actuators to open the valves when the first turbo charger reaches peak efficiency so that diverting exhaust gas to the second turbo charger will provide better performance gains from the engine than continuing to deliver all exhaust gas to the first turbocharger.

While peak efficiency of the first turbocharger is one threshold at which the controller or the actuators could be configured to open the valve, other user selected or programed thresholds may be used depending on the selected components, such as type and size of the turbos, engine size, and/or other components, and the performance goals of the users. Therefore, the condition(s) upon which the valves are caused to be open or can be selected by the user to achieve the desired performance.

In some embodiments, the controller 382 is an engine control unit (ECU) that controls the operation of the engine 12, and components of thereof, as well as the valves 28, 74, 76. The ECU may also receive data from one or more other sensors for controlling engine operation. In some embodiments, the controller 382 is in communication with and/or directed by the ECU.

In some embodiments, the references to conduit herein includes pipe as a conduit. The conduit(s) of the turbocharger manifolds disclosed herein have one or more enclosing walls that are gas impermeable so as to contain the exhaust gas within the conduit and allow it to travel in the open space within the conduit bounded by the enclosing wall or walls. In some embodiments, a turbocharger wastegate is added at location 113 (FIG. 9).

In some embodiments, the controller 382 comprises processing circuitry. The processing circuitry may comprise one or more of microprocessor(s), microcontroller(s), a hardware circuit(s), application-specific integrated circuit(s) (ASIC), digital signal processor(s) (DSP), field-programmable gate array(s) (FPGA), discrete logic circuit(s), or combinations thereof for performing the operations of the controller 382 or the ECU.

From the foregoing, it will be observed that numerous variations and modifications may be affected without departing from the spirit and scope of the invention. It is to be understood that no limitation with respect to the specific apparatus illustrated herein is intended or should be inferred. For example, one or more component embodiments may be combined, modified, removed, or supplemented to form further embodiments within the scope of the invention. Further, steps could be added or removed from the processes described. Therefore, other embodiments and implementations are within the scope of the invention.

The invention claimed is:

1. A method of controlling exhaust gas delivery between two turbochargers, comprising the steps of:
   releasably connecting a first exhaust conduit to an exhaust manifold of an internal combustion engine and to a first turbocharger;
   releasably connecting a bridge conduit to an outlet of the first turbocharger;
   releasably connecting a second exhaust conduit to a second turbocharger, the second exhaust conduit intersects the first exhaust conduit;
   delivering an exhaust gas to the first turbocharger through the first exhaust conduit;
   delivering the exhaust gas from the outlet of the first turbocharger to the second turbocharger through the bridge conduit;
   sensing a predefined operating speed of the first turbocharger with a sensor; and,
   opening a valve to allow at least some of the exhaust gas from the first exhaust conduit to bypass the first turbocharger through the second exhaust conduit and delivering the bypassing exhaust gas to the second turbocharger in response to sensing the first turbocharger reached the predefined operating speed.

2. The method of claim 1, wherein the step of opening the valve is defined in that the valve is located at an intersection of the first exhaust conduit and the second exhaust conduit.

3. The method of claim 1, wherein the step of opening is defined in that valve is opened with an actuator.

4. The method of claim 1, wherein the step of opening is defined in that valve is opened with a linear actuator or servo motor.

5. The method of claim 1, wherein the step of opening is defined in that valve comprises a door and an arm mechanism, the arm mechanism connected to the door, and the arm mechanism is driven by an actuator to move the door.

6. The method of claim 1, wherein the step opening comprises moving the valve from a closed position where the valve blocks the exhaust gas within the first exhaust conduit from entering the second exhaust conduit to an open position where the valve allows at least some of the exhaust gas from within the first exhaust conduit to enter the second exhaust conduit.

7. The method of claim 1, wherein
   the step of releasably connecting the first exhaust conduit to the exhaust manifold of the internal combustion engine and to the first turbocharger, comprises releasably connecting the first exhaust conduit at a first flange to the exhaust manifold and connecting the first exhaust conduit at a second flange to the first turbocharger;
   the step of releasably connecting the bridge conduit to the outlet of the first turbocharger comprises releasably connecting the bridge conduit at a third flange to the outlet of the first turbocharger; and,
   the step of releasably connecting the second exhaust conduit to the second turbocharger comprises releasably connecting the second exhaust conduit at a fourth flange to the second turbocharger.

8. A method of controlling exhaust gas delivery between two turbochargers, comprising the steps of:
releasably connecting a first exhaust conduit to an exhaust manifold of an internal combustion engine and to a first turbocharger;
releasably connecting a bridge conduit to an outlet of the first turbocharger;
releasably connecting a second exhaust conduit to a second turbocharger, the second exhaust conduit intersects the first exhaust conduit;
delivering an exhaust gas to the first turbocharger through the first exhaust conduit;
delivering the exhaust gas from the outlet of the first turbocharger to the second turbocharger through the bridge conduit; and,
opening a valve to allow at least some of the exhaust gas from the first exhaust conduit to bypass the first turbocharger through the second exhaust conduit and delivering the bypassing exhaust gas to the second turbocharger in response to a predefined exhaust gas pressure upstream of the first turbocharger.

9. The method of claim 8, wherein the step of opening the valve is defined in that the valve is located at an intersection of the first exhaust conduit and the second exhaust conduit.

10. The method of claim 8, wherein the step of opening is defined in that valve is opened with an actuator.

11. The method of claim 8, wherein the step of opening is defined in that valve is opened with a linear actuator or servo motor.

12. The method of claim 8, wherein the step of opening in defined a that the valve is driven opened by a diaphragm, where the diaphragm moved by the predefined exhaust gas pressure.

13. The method of claim 8, wherein the step of opening is defined in that valve comprises a door and an arm mechanism, the arm mechanism connected to the door, and the arm mechanism is driven by an actuator to move the door.

14. The method of claim 8, wherein the step of opening comprises moving the valve from a closed position where the valve blocks the exhaust gas within the first exhaust conduit from entering the second exhaust conduit to an open position where the valve allows at least some of the exhaust gas from within the first exhaust conduit to enter the second exhaust conduit.

15. The method of claim 8, wherein
the step of releasably connecting the first exhaust conduit to the exhaust manifold of the internal combustion engine and to the first turbocharger, comprises releasably connecting the first exhaust conduit at a first flange to the exhaust manifold and connecting the first exhaust conduit at a second flange to the first turbocharger;
the step of releasably connecting the bridge conduit to the outlet of the first turbocharger comprises releasably connecting the bridge conduit at a third flange to the outlet of the first turbocharger; and,
the step of releasably connecting the second exhaust conduit to the second turbocharger comprises releasably connecting the second exhaust conduit at a fourth flange to the second turbocharger.

16. The method of claim 8, wherein the step of opening is further defined in that the predefined exhaust gas pressure upstream of the first turbocharger is the predefined exhaust gas pressure within the first exhaust conduit upstream of the first turbocharger.

17. The method of claim 8, comprising the step of detecting the predefined exhaust gas pressure upstream of the first turbocharger with a pressure sensor; and wherein the step of opening the valve comprises the step of opening the valve to allow at least some of the exhaust gas from the first exhaust conduit to bypass the first turbocharger through the second exhaust conduit and delivering the bypassing exhaust gas to the second turbocharger in response to detecting the predefined exhaust gas pressure upstream of the first turbocharger.

18. The method of claim 17, wherein the step of detecting comprises the step of detecting the predefined exhaust gas pressure within the first exhaust conduit upstream of the first turbocharger, and wherein the step of opening is further defined in that the predefined exhaust gas pressure upstream of the first turbocharger is the predefined exhaust gas pressure within the first exhaust conduit upstream of the first turbocharger.

* * * * *